(12) United States Patent
Bhaskaran et al.

(10) Patent No.: US 11,084,410 B1
(45) Date of Patent: Aug. 10, 2021

(54) AUTOMATED GUIDED VEHICLE FOR TRANSPORTING SHELVING UNITS

(71) Applicant: Staples, Inc., Framingham, MA (US)

(72) Inventors: Michael Bhaskaran, Sherborn, MA (US); Weston Harris, Allston, MA (US); Maimuna Rangwala, North Grafton, MA (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 16/534,974

(22) Filed: Aug. 7, 2019

Related U.S. Application Data

(60) Provisional application No. 62/715,755, filed on Aug. 7, 2018.

(51) Int. Cl.
| | |
|---|---|
| *B60P 1/02* | (2006.01) |
| *B66F 5/00* | (2006.01) |
| *G05D 1/02* | (2020.01) |

(52) U.S. Cl.
CPC ............... *B60P 1/02* (2013.01); *B66F 5/00* (2013.01); *G05D 1/0234* (2013.01); *G05D 2201/0216* (2013.01)

(58) Field of Classification Search
CPC .. G05D 2201/0216; G05D 1/0234; B66F 5/00
See application file for complete search history.

(56) References Cited

U.S. PATENT DOCUMENTS

| | | |
|---|---|---|
| 3,450,276 A | 6/1969 | Ferrari |
| 3,474,877 A | 10/1969 | Wesener |
| 3,628,624 A | 12/1971 | Wesener |
| 3,970,840 A | 7/1976 | De Bruine |
| 4,010,409 A | 3/1977 | Waites |
| 4,215,759 A | 8/1980 | Diaz |

(Continued)

FOREIGN PATENT DOCUMENTS

| | | |
|---|---|---|
| CA | 1196712 A | 11/1985 |
| CA | 1210367 A | 8/1986 |

(Continued)

OTHER PUBLICATIONS

US 7,460,017 B2, 12/2008, Roeder et al. (withdrawn)

(Continued)

*Primary Examiner* — Kaitlin S Joerger
(74) *Attorney, Agent, or Firm* — VLP Law Group, LLP

(57) ABSTRACT

An automated guided vehicle (AGV) is described. In an example implementation, the AGV may include a lift platform and an AGV controller configured to control one or more operations of the AGV. The lift platform of the AGV may include a support surface adapted to contact a surface of a shelving unit and provide support from underneath the shelving unit when the support surface is in an elevated position and the shelving unit is situated on the support surface, and a lifting mechanism including motor(s) coupled to the support surface and providing a first lifting force via a first portion of the support surface and a second lifting force via a second portion of the support surface, the first lifting force and the second lifting force vertically lifting or lowering the shelving unit via the support surface based on a weight distribution of the shelving unit on the support surface.

20 Claims, 13 Drawing Sheets

(56) References Cited

U.S. PATENT DOCUMENTS

| | | |
|---|---|---|
| 4,258,813 A | 3/1981 | Rubel |
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | MacKinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki et al. |
| 4,773,018 A | 9/1988 | Lundstrom |
| 4,777,601 A | 10/1988 | Boegli |
| 4,780,817 A | 10/1988 | Lofgren |
| 4,790,402 A | 12/1988 | Field et al. |
| 4,802,096 A | 1/1989 | Hainsworth et al. |
| 4,811,227 A | 3/1989 | Wikstrom |
| 4,811,229 A | 3/1989 | Wilson |
| 4,817,000 A | 3/1989 | Eberhardt |
| 4,846,297 A | 7/1989 | Field et al. |
| 4,847,769 A | 7/1989 | Reeve |
| 4,847,773 A | 7/1989 | van Helsdingen et al. |
| 4,847,774 A | 7/1989 | Tomikawa et al. |
| 4,852,677 A | 8/1989 | Okazaki |
| 4,857,912 A | 8/1989 | Everett, Jr. et al. |
| 4,858,132 A | 8/1989 | Holmquist |
| 4,862,047 A | 8/1989 | Suzuki et al. |
| 4,863,335 A | 9/1989 | Herigstad et al. |
| 4,875,172 A | 10/1989 | Kanayama |
| 4,890,233 A | 12/1989 | Ando et al. |
| 4,918,607 A | 4/1990 | Wible |
| 4,924,153 A | 5/1990 | Toru et al. |
| 4,926,544 A | 5/1990 | Koyanagi et al. |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth et al. |
| 4,947,324 A | 8/1990 | Kamimura et al. |
| 4,950,118 A | 8/1990 | Mueller et al. |
| 4,954,962 A | 9/1990 | Evans, Jr. et al. |
| 4,982,329 A | 1/1991 | Tabata et al. |
| 4,990,841 A | 2/1991 | Elder |
| 4,993,507 A | 2/1991 | Ohkura |
| 4,994,970 A | 2/1991 | Noji et al. |
| 4,996,468 A | 2/1991 | Field et al. |
| 5,000,279 A | 3/1991 | Kondo et al. |
| 5,002,145 A | 3/1991 | Wakaumi et al. |
| 5,005,128 A | 4/1991 | Robins et al. |
| 5,006,988 A | 4/1991 | Borenstein et al. |
| 5,020,620 A | 6/1991 | Field |
| 5,023,790 A | 6/1991 | Luke, Jr. |
| 5,040,116 A | 8/1991 | Evans, Jr. et al. |
| 5,052,882 A | 10/1991 | Blau et al. |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett, Jr. et al. |
| 5,125,783 A | 6/1992 | Kawasoe et al. |
| 5,134,353 A | 7/1992 | Kita et al. |
| 5,138,560 A | 8/1992 | Lanfer et al. |
| 5,154,249 A | 10/1992 | Yardley |
| 5,164,648 A | 11/1992 | Kita et al. |
| 5,170,351 A | 12/1992 | Nemoto et al. |
| 5,170,352 A | 12/1992 | McTamaney et al. |
| 5,179,329 A | 1/1993 | Nishikawa et al. |
| 5,187,664 A | 2/1993 | Yardley et al. |
| 5,191,528 A | 3/1993 | Yardley et al. |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada Galan et al. |
| 5,213,176 A * | 5/1993 | Oroku .................. B60B 19/003 180/168 |
| 5,216,605 A | 6/1993 | Yardley et al. |
| 5,239,249 A | 8/1993 | Ono |
| 5,249,157 A | 9/1993 | Taylor |
| 5,281,901 A | 1/1994 | Yardley et al. |
| 5,305,217 A | 4/1994 | Nakamura et al. |
| 5,341,130 A | 8/1994 | Yardley et al. |
| 5,387,853 A | 2/1995 | Ono |
| 5,488,277 A | 1/1996 | Nishikawa et al. |
| 5,510,984 A | 4/1996 | Markin et al. |
| 5,525,884 A | 6/1996 | Sugiura et al. |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Nishikawa et al. |
| 5,650,703 A | 7/1997 | Yardley et al. |
| 5,669,748 A | 9/1997 | Knudsen, Jr. |
| 5,875,408 A | 2/1999 | Bendett et al. |
| 5,911,767 A | 6/1999 | Garibotto et al. |
| 5,923,270 A | 7/1999 | Sampo et al. |
| 5,961,559 A | 10/1999 | Shimbara et al. |
| 6,049,745 A | 4/2000 | Douglas et al. |
| 6,058,339 A | 5/2000 | Takiguchi et al. |
| 6,092,010 A | 7/2000 | Alofs et al. |
| 6,246,930 B1 | 6/2001 | Hori |
| 6,256,560 B1 | 7/2001 | Kim et al. |
| 6,345,217 B1 | 2/2002 | Zeitler et al. |
| 6,370,452 B1 | 4/2002 | Pfister |
| 6,377,888 B1 | 4/2002 | Olch |
| 6,459,966 B2 | 10/2002 | Nakano et al. |
| 6,477,463 B2 | 11/2002 | Hamilton |
| 6,493,614 B1 | 12/2002 | Jung |
| 6,602,037 B2 | 8/2003 | Winkler |
| 6,615,108 B1 | 9/2003 | Peless et al. |
| 6,629,028 B2 | 9/2003 | Paromtchik et al. |
| 6,654,647 B1 | 11/2003 | Kal |
| 6,721,638 B2 | 4/2004 | Zeitler |
| 6,748,292 B2 | 6/2004 | Mountz |
| 6,772,062 B2 | 8/2004 | Lasky et al. |
| 6,882,910 B2 | 4/2005 | Jeong |
| 6,885,912 B2 | 4/2005 | Peless et al. |
| 6,895,301 B2 | 5/2005 | Mountz |
| 6,904,343 B2 | 6/2005 | Kang |
| 6,950,722 B2 | 9/2005 | Mountz |
| 6,971,464 B2 | 12/2005 | Marino et al. |
| 7,050,891 B2 | 5/2006 | Chen |
| 7,110,855 B2 | 9/2006 | Leishman |
| 7,155,309 B2 | 12/2006 | Peless et al. |
| 7,305,287 B2 | 12/2007 | Park |
| 7,333,631 B2 | 2/2008 | Roh et al. |
| 7,349,759 B2 | 3/2008 | Peless et al. |
| 7,402,018 B2 | 7/2008 | Mountz et al. |
| 7,403,120 B2 | 7/2008 | Duron et al. |
| 7,437,226 B2 | 10/2008 | Roh et al. |
| 7,460,016 B2 | 12/2008 | Sorenson, Jr. et al. |
| 7,505,849 B2 | 3/2009 | Saarikivi |
| 7,548,166 B2 | 6/2009 | Roeder et al. |
| 7,557,714 B2 | 7/2009 | Roeder et al. |
| 7,609,175 B2 | 10/2009 | Porte et al. |
| 7,613,617 B2 | 11/2009 | Williams et al. |
| 7,616,127 B2 | 11/2009 | Sorenson, Jr. et al. |
| 7,634,332 B2 | 12/2009 | Williams et al. |
| 7,639,142 B2 | 12/2009 | Roeder et al. |
| 7,648,329 B2 | 1/2010 | Chilson et al. |
| 7,656,296 B2 | 2/2010 | Runyon et al. |
| 7,681,796 B2 | 3/2010 | Cato et al. |
| 7,689,001 B2 | 3/2010 | Kim et al. |
| 7,693,757 B2 | 4/2010 | Zimmerman |
| 7,765,027 B2 | 7/2010 | Hong et al. |

(56) References Cited

U.S. PATENT DOCUMENTS

| | | |
|---|---|---|
| 7,826,919 B2 | 11/2010 | DAndrea et al. |
| 7,835,821 B2 | 11/2010 | Roh et al. |
| 7,840,328 B2 | 11/2010 | Baginski et al. |
| 7,845,560 B2 | 12/2010 | Emanuel et al. |
| 7,850,413 B2 | 12/2010 | Fontana |
| 7,873,469 B2 | 1/2011 | DAndrea et al. |
| 7,890,228 B2 | 2/2011 | Redmann, Jr. et al. |
| 7,894,932 B2 | 2/2011 | Mountz et al. |
| 7,894,933 B2 | 2/2011 | Mountz et al. |
| 7,894,939 B2 | 2/2011 | Zini et al. |
| 7,894,951 B2 | 2/2011 | Norris et al. |
| 7,912,574 B2 | 3/2011 | Wurman et al. |
| 7,912,633 B1 | 3/2011 | Dietsch et al. |
| 7,920,962 B2 | 4/2011 | DAndrea et al. |
| 7,925,514 B2 | 4/2011 | Williams et al. |
| 7,953,551 B2 | 5/2011 | Park et al. |
| 7,980,808 B2 | 7/2011 | Chilson et al. |
| 7,991,521 B2 | 8/2011 | Stewart |
| 7,996,109 B2 | 8/2011 | Zini et al. |
| 8,010,230 B2 | 8/2011 | Zini et al. |
| 8,020,657 B2 | 9/2011 | Allard et al. |
| 8,031,086 B2 | 10/2011 | Thacher et al. |
| 8,068,978 B2 | 11/2011 | DAndrea et al. |
| 8,072,309 B2 | 12/2011 | Kraimer et al. |
| 8,075,243 B2 | 12/2011 | Chilson et al. |
| 8,146,702 B2 | 4/2012 | Schendel et al. |
| 8,160,728 B2 | 4/2012 | Curtis |
| 8,170,711 B2 | 5/2012 | DAndrea et al. |
| 8,192,137 B2 | 6/2012 | Ross et al. |
| 8,193,903 B2 | 6/2012 | Kraimer et al. |
| 8,196,835 B2 | 6/2012 | Emanuel et al. |
| 8,200,423 B2 | 6/2012 | Dietsch et al. |
| 8,204,624 B2 | 6/2012 | Zini et al. |
| 8,210,791 B2 | 7/2012 | Chilson et al. |
| 8,220,710 B2 | 7/2012 | Hoffman et al. |
| 8,229,619 B2 | 7/2012 | Roh et al. |
| 8,239,291 B2 | 8/2012 | Hoffman et al. |
| 8,265,873 B2 | 9/2012 | DAndrea et al. |
| 8,269,643 B2 | 9/2012 | Chou |
| 8,271,132 B2 | 9/2012 | Nielsen et al. |
| 8,280,546 B2 | 10/2012 | DAndrea et al. |
| 8,280,547 B2 | 10/2012 | DAndrea et al. |
| 8,311,902 B2 | 11/2012 | Mountz et al. |
| 8,369,981 B2 | 2/2013 | Dunsker et al. |
| 8,381,982 B2 | 2/2013 | Kunzig et al. |
| 8,406,949 B2 | 3/2013 | Kondo |
| 8,412,400 B2 | 4/2013 | DAndrea et al. |
| 8,417,444 B2 | 4/2013 | Smid et al. |
| 8,418,919 B1 | 4/2013 | Beyda |
| 8,433,442 B2 | 4/2013 | Friedman et al. |
| 8,433,469 B2 | 4/2013 | Harvey et al. |
| 8,444,369 B2 | 5/2013 | Watt et al. |
| 8,452,464 B2 | 5/2013 | Castaneda et al. |
| 8,457,978 B2 | 6/2013 | Williams et al. |
| 8,473,140 B2 | 6/2013 | Norris et al. |
| 8,483,869 B2 | 7/2013 | Wurman et al. |
| 8,498,734 B2 | 7/2013 | Dunsker et al. |
| 8,515,612 B2 | 8/2013 | Tanaka et al. |
| 8,538,692 B2 | 9/2013 | Wurman et al. |
| 8,571,781 B2 | 10/2013 | Bernstein et al. |
| 8,577,551 B2 | 11/2013 | Siefring et al. |
| 8,587,455 B2 | 11/2013 | Porte et al. |
| 8,594,834 B1 | 11/2013 | Clark et al. |
| 8,606,392 B2 | 12/2013 | Wurman et al. |
| 8,626,332 B2 | 1/2014 | Dunsker et al. |
| 8,626,335 B2 | 1/2014 | Wurman et al. |
| 8,639,382 B1 | 1/2014 | Clark et al. |
| 8,649,899 B2 | 2/2014 | Wurman et al. |
| 8,653,945 B2 | 2/2014 | Baek et al. |
| 8,670,892 B2 | 3/2014 | Yang |
| 8,676,426 B1 | 3/2014 | Murphy |
| 8,700,502 B2 | 4/2014 | Mountz et al. |
| 8,718,814 B1 | 5/2014 | Clark et al. |
| 8,725,286 B2 | 5/2014 | DAndrea et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,751,063 B2 | 6/2014 | Bernstein et al. |
| 8,751,147 B2 | 6/2014 | Colwell |
| 8,755,936 B2 | 6/2014 | Friedman et al. |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark et al. |
| 8,798,786 B2 | 8/2014 | Wurman et al. |
| 8,798,840 B2 | 8/2014 | Fong et al. |
| 8,805,573 B2 | 8/2014 | Brunner et al. |
| 8,805,574 B2 | 8/2014 | Stevens et al. |
| 8,825,257 B2 | 9/2014 | Ozaki et al. |
| 8,831,984 B2 | 9/2014 | Hoffman et al. |
| 8,862,397 B2 | 10/2014 | Tsujimoto et al. |
| 8,874,300 B2 | 10/2014 | Allard et al. |
| 8,874,360 B2 | 10/2014 | Klinger et al. |
| 8,880,416 B2 | 11/2014 | Williams et al. |
| 8,886,385 B2 | 11/2014 | Takahashi et al. |
| 8,892,240 B1 | 11/2014 | Vliet et al. |
| 8,892,241 B2 | 11/2014 | Weiss |
| 8,909,368 B2 | 12/2014 | DAndrea et al. |
| 8,930,133 B2 | 1/2015 | Wurman et al. |
| 8,948,956 B2 | 2/2015 | Takahashi et al. |
| 8,954,188 B2 | 2/2015 | Sullivan et al. |
| 8,965,561 B2 | 2/2015 | Jacobus et al. |
| 8,965,562 B1 | 2/2015 | Wurman et al. |
| 8,965,578 B2 | 2/2015 | Versteeg et al. |
| 8,970,363 B2 | 3/2015 | Kraimer et al. |
| 8,972,045 B1 | 3/2015 | Mountz et al. |
| 8,983,647 B1 | 3/2015 | Dwarakanath et al. |
| 8,988,285 B2 | 3/2015 | Smid et al. |
| 8,989,918 B2 | 3/2015 | Sturm |
| 9,002,506 B1 | 4/2015 | Agarwal et al. |
| 9,002,581 B2 | 4/2015 | Castaneda et al. |
| 9,008,827 B1 | 4/2015 | Dwarakanath et al. |
| 9,008,828 B2 | 4/2015 | Worsley |
| 9,008,829 B2 | 4/2015 | Worsley |
| 9,008,830 B2 | 4/2015 | Worsley |
| 9,009,072 B2 | 4/2015 | Mountz et al. |
| 9,014,902 B1 | 4/2015 | Murphy |
| 9,020,679 B2 | 4/2015 | Zini et al. |
| 9,026,301 B2 | 5/2015 | Zini et al. |
| 9,043,016 B2 | 5/2015 | Filippov et al. |
| 9,046,893 B2 | 6/2015 | Douglas et al. |
| 9,052,714 B2 | 6/2015 | Creasey et al. |
| 9,056,719 B2 | 6/2015 | Tanahashi |
| 9,067,317 B1 | 6/2015 | Wurman et al. |
| 9,073,736 B1 | 7/2015 | Hussain et al. |
| 9,082,293 B2 | 7/2015 | Wellman et al. |
| 9,087,314 B2 | 7/2015 | Hoffman et al. |
| 9,090,214 B2 | 7/2015 | Bernstein et al. |
| 9,090,400 B2 | 7/2015 | Wurman et al. |
| 9,098,080 B2 | 8/2015 | Norris et al. |
| 9,110,464 B2 | 8/2015 | Holland et al. |
| 9,111,251 B1 | 8/2015 | Brazeau |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B1 | 11/2015 | Dwarakanath et al. |
| 9,188,982 B2 | 11/2015 | Thomson |
| 9,193,404 B2 | 11/2015 | Bernstein et al. |
| 9,202,382 B2 | 12/2015 | Klinger et al. |
| 9,206,023 B2 | 12/2015 | Wong et al. |
| 9,207,673 B2 | 12/2015 | Pulskamp et al. |
| 9,207,676 B2 | 12/2015 | Wu et al. |
| 9,211,920 B1 | 12/2015 | Bernstein et al. |
| 9,213,934 B1 | 12/2015 | Versteeg et al. |
| 9,216,745 B2 | 12/2015 | Beardsley et al. |
| 9,218,003 B2 | 12/2015 | Fong et al. |

(56) References Cited

U.S. PATENT DOCUMENTS

| | | |
|---|---|---|
| 9,218,316 B2 | 12/2015 | Bernstein et al. |
| 9,242,799 B1 | 1/2016 | OBrien et al. |
| 9,244,463 B2 | 1/2016 | Pfaff et al. |
| 9,248,973 B1 | 2/2016 | Brazeau |
| 9,260,244 B1 | 2/2016 | Cohn |
| 9,266,236 B2 | 2/2016 | Clark et al. |
| 9,268,334 B1 | 2/2016 | Vavrick |
| 9,274,526 B2 | 3/2016 | Murai et al. |
| 9,280,153 B1 | 3/2016 | Palamarchuk et al. |
| 9,280,157 B2 | 3/2016 | Wurman et al. |
| 9,290,220 B2 | 3/2016 | Bernstein et al. |
| 9,304,001 B2 | 4/2016 | Park et al. |
| 9,310,802 B1 | 4/2016 | Elkins et al. |
| 9,317,034 B2 | 4/2016 | Hoffman et al. |
| 9,329,078 B1 | 5/2016 | Mundhenke et al. |
| 9,329,599 B1 | 5/2016 | Sun et al. |
| 9,330,373 B2 | 5/2016 | Mountz et al. |
| 9,341,720 B2 | 5/2016 | Garin et al. |
| 9,342,811 B2 | 5/2016 | Mountz et al. |
| 9,346,619 B1 | 5/2016 | OBrien et al. |
| 9,346,620 B2 | 5/2016 | Brunner et al. |
| 9,352,745 B1 | 5/2016 | Theobald |
| 9,355,065 B2 | 5/2016 | Donahue |
| 9,365,348 B1 | 6/2016 | Agarwal et al. |
| 9,367,827 B1 | 6/2016 | Lively et al. |
| 9,367,831 B1 | 6/2016 | Besehanic |
| 9,371,184 B1 | 6/2016 | Dingle et al. |
| 9,378,482 B1 | 6/2016 | Pikler et al. |
| 9,389,609 B1 | 7/2016 | Mountz et al. |
| 9,389,612 B2 | 7/2016 | Bernstein et al. |
| 9,389,614 B2 | 7/2016 | Shani |
| 9,394,016 B2 | 7/2016 | Bernstein et al. |
| 9,395,725 B2 | 7/2016 | Bernstein et al. |
| 9,404,756 B2 | 8/2016 | Fong et al. |
| 9,405,016 B2 | 8/2016 | Yim |
| 9,427,874 B1 | 8/2016 | Rublee |
| 9,429,940 B2 | 8/2016 | Bernstein et al. |
| 9,429,944 B2 | 8/2016 | Filippov et al. |
| 9,436,184 B2 | 9/2016 | DAndrea et al. |
| 9,440,790 B2 | 9/2016 | Mountz et al. |
| 9,448,560 B2 | 9/2016 | DAndrea et al. |
| 9,451,020 B2 | 9/2016 | Liu et al. |
| 9,452,883 B1 | 9/2016 | Wurman et al. |
| 9,457,730 B2 | 10/2016 | Bernstein et al. |
| 9,823,662 B2 * | 11/2017 | Mecklinger ............ B60P 1/6409 |
| 10,328,836 B2 * | 6/2019 | Purwin .................... B66F 9/063 |
| 10,589,940 B2 * | 3/2020 | Yang ........................ B65G 43/10 |
| 10,627,829 B2 * | 4/2020 | Lin ........................ G05D 1/0234 |
| 10,628,790 B1 * | 4/2020 | Aggarwal ............ G06Q 10/087 |
| 2006/0245893 A1 | 11/2006 | Schottke |
| 2010/0300841 A1 | 12/2010 | OBrien |
| 2012/0321423 A1 | 12/2012 | MacKnight et al. |
| 2013/0058743 A1 | 3/2013 | Rebstock |
| 2013/0302132 A1 | 11/2013 | DAndrea |
| 2014/0124462 A1 | 5/2014 | Yamashita |
| 2014/0247116 A1 * | 9/2014 | Davidson ............. G06Q 10/087 |
| | | 340/10.1 |
| 2015/0073589 A1 | 3/2015 | Khodl et al. |
| 2015/0117995 A1 | 4/2015 | DAndrea |
| 2015/0125252 A1 * | 5/2015 | Berzen Ratzel ....... B62D 11/20 |
| | | 414/800 |
| 2015/0307278 A1 | 10/2015 | Wickham et al. |
| 2016/0090283 A1 * | 3/2016 | Svensson ............. H04N 13/204 |
| | | 701/50 |
| 2016/0176637 A1 | 6/2016 | Ackerman et al. |
| 2016/0203543 A1 | 7/2016 | Snow |
| 2016/0232477 A1 | 8/2016 | Cortes et al. |
| 2016/0347545 A1 | 12/2016 | Lindbo et al. |
| 2017/0043953 A1 | 2/2017 | Battles et al. |
| 2017/0174431 A1 | 6/2017 | Borders et al. |
| 2017/0182924 A1 * | 6/2017 | Lendo .................... H02J 7/025 |
| 2018/0141752 A1 * | 5/2018 | Nakanishi ............... B66F 9/063 |
| 2018/0208398 A1 * | 7/2018 | Haveman ................. B66F 9/24 |
| 2019/0016573 A1 * | 1/2019 | D'Andrea ............ G05D 1/0297 |
| 2020/0103916 A1 * | 4/2020 | Tu ........................ G05D 1/0214 |

FOREIGN PATENT DOCUMENTS

| | | |
|---|---|---|
| CA | 1228142 A | 10/1987 |
| CA | 1238103 A | 6/1988 |
| CA | 1264490 A | 1/1990 |
| CA | 1267866 A | 4/1990 |
| CA | 1269740 A | 5/1990 |
| CA | 1271544 A | 7/1990 |
| CA | 1275721 C | 10/1990 |
| CA | 1276264 C | 11/1990 |
| CA | 2029773 A1 | 5/1991 |
| CA | 1291725 C | 11/1991 |
| CA | 2036104 A1 | 11/1991 |
| CA | 2042133 A1 | 1/1992 |
| CA | 2049578 A1 | 2/1992 |
| CA | 2296837 A1 | 2/1992 |
| CA | 2094833 A1 | 4/1992 |
| CA | 1304043 C | 6/1992 |
| CA | 2095442 A1 | 6/1992 |
| CA | 1304820 C | 7/1992 |
| CA | 1323084 C | 10/1993 |
| CA | 2189853 A1 | 11/1995 |
| CA | 2244668 A1 | 3/1999 |
| CA | 2469652 A1 | 6/2003 |
| CA | 2514523 A1 | 8/2004 |
| CA | 2565553 A1 | 11/2005 |
| CA | 2577346 A1 | 4/2006 |
| CA | 2613180 A1 | 1/2007 |
| CA | 2921584 A1 | 1/2007 |
| CA | 2625885 A1 | 4/2007 |
| CA | 2625895 A1 | 4/2007 |
| CA | 2837477 A1 | 4/2007 |
| CA | 2864027 A1 | 4/2007 |
| CA | 2636233 A1 | 7/2007 |
| CA | 2640769 A1 | 8/2007 |
| CA | 2652114 A1 | 12/2007 |
| CA | 2654258 A1 | 12/2007 |
| CA | 2654260 A1 | 12/2007 |
| CA | 2654263 A1 | 12/2007 |
| CA | 2654295 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781624 A1 | 12/2007 |
| CA | 2781857 A1 | 12/2007 |
| CA | 2838044 A1 | 12/2007 |
| CA | 2866664 A1 | 12/2007 |
| CA | 2921134 A1 | 12/2007 |
| CA | 2663578 A1 | 4/2008 |
| CA | 2860745 A1 | 4/2008 |
| CA | 2671955 A1 | 7/2008 |
| CA | 2673025 A1 | 7/2008 |
| CA | 2674241 A1 | 7/2008 |
| CA | 2691710 A1 | 12/2008 |
| CA | 2721345 A1 | 10/2009 |
| CA | 2760127 A1 | 11/2009 |
| CA | 2760225 A1 | 11/2009 |
| CA | 2743706 A1 | 6/2010 |
| CA | 2754626 A1 | 9/2010 |
| CA | 2765565 A1 | 1/2011 |
| CA | 2932535 A1 | 1/2011 |
| CA | 2932537 A1 | 1/2011 |
| CA | 2770139 A1 | 2/2011 |
| CA | 2773963 A1 | 3/2011 |
| CA | 2778111 A1 | 5/2011 |
| CA | 2784874 A1 | 7/2011 |
| CA | 2868578 A1 | 7/2011 |
| CA | 2806852 A1 | 2/2012 |
| CA | 2823715 A1 | 7/2012 |
| CA | 2827281 A1 | 8/2012 |
| CA | 2827735 A1 | 8/2012 |
| CA | 2770715 A1 | 9/2012 |
| CA | 2770918 A1 | 9/2012 |
| CA | 2831832 A1 | 10/2012 |
| CA | 2836933 A1 | 12/2012 |
| CA | 2851774 A1 | 4/2013 |
| CA | 2799871 A1 | 6/2013 |

(56) References Cited

FOREIGN PATENT DOCUMENTS

| | | | |
|---|---|---|---|
| CA | 2866708 | A1 | 9/2013 |
| CA | 2938894 | A1 | 9/2013 |
| CA | 2813874 | A1 | 12/2013 |
| CA | 2824189 | A1 | 2/2014 |
| CA | 2870381 | A1 | 4/2014 |
| CA | 2935223 | A1 | 4/2014 |
| CA | 2894546 | A1 | 6/2014 |
| CA | 2845229 | A1 | 9/2014 |
| CA | 2899553 | A1 | 10/2014 |
| CA | 2882452 | A1 | 8/2015 |
| CA | 2886121 | A1 | 10/2015 |
| WO | 2012154872 | A2 | 11/2012 |
| WO | 2016015000 | A2 | 1/2016 |

OTHER PUBLICATIONS

US 9,050,932 B2, 06/2015, Bernstein et al. (withdrawn)
US 9,342,073 B2, 05/2016, Bernstein et al. (withdrawn)
Warehouse Robots at Work, IEEE Spectrum,. Jul. 21, 2008, YouTube https://www.youtube.com/watch?v=IWsMdN7HMuA.
International Search Report and Written Opinion, PCT/US2017/054627, dated Jan. 5, 2018 (15 pages).
International Search Report and Written Opinion, PCT/US2018/012645, dated Mar. 7, 2018 (13 pages).
International Search Report and Written Opinion, PCT/US2018/012641, dated Mar. 7, 2018 (17 pages).

\* cited by examiner

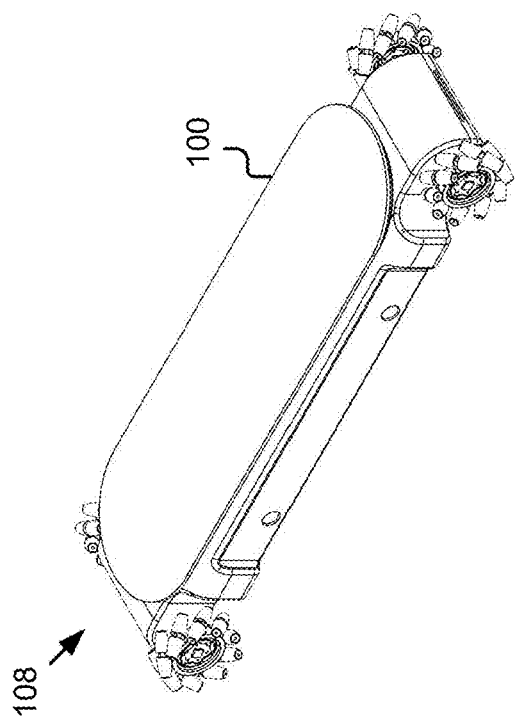
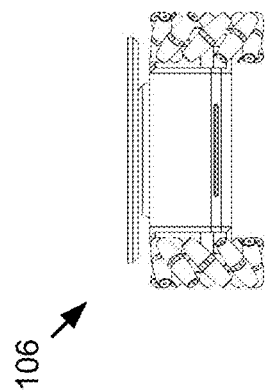
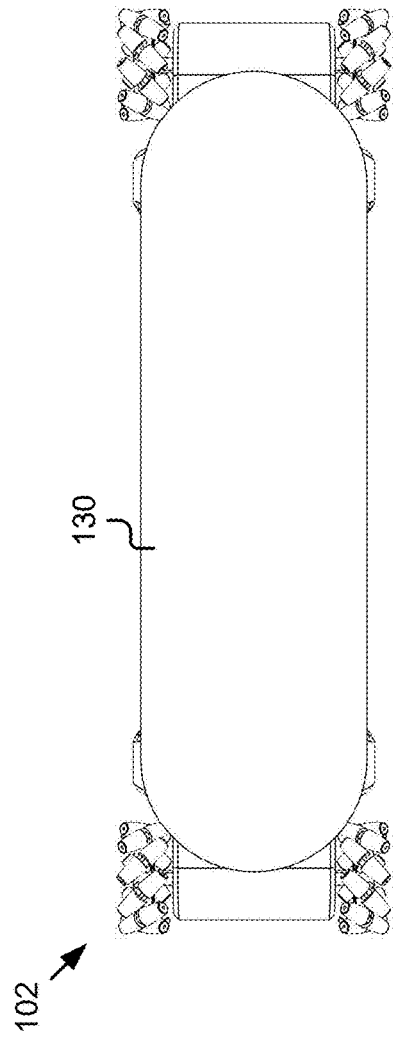
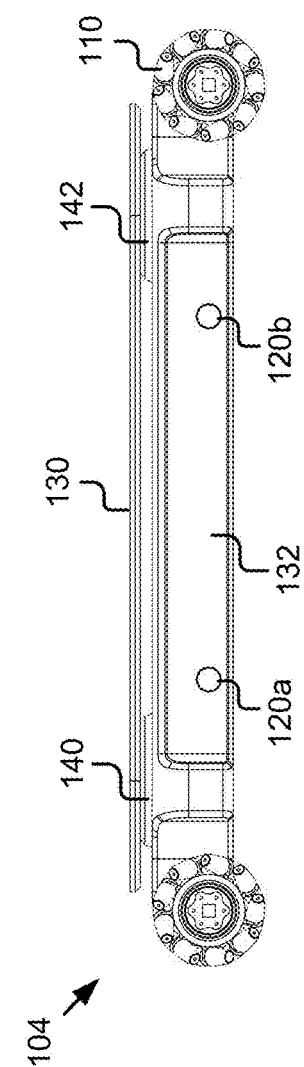
Figure 1A
Figure 1B
Figure 1C
Figure 1D

AUTOMATED GUIDED VEHICLE FOR TRANSPORTING SHELVING UNITS

BACKGROUND

This present disclosure relates to automated guided vehicles (AGVs). In a more particular example, this present disclosure relates to automated guided vehicles that automatically transport shelving units between different locations.

Storage facilities usually rely on human workers to transport shelving units between different locations in the storage facility. For example, the human workers may enter a delivery truck docked at the storage facility, manually move the shelving unit out of its original position in the delivery truck, and drag the shelving unit from the delivery truck onto the floor of the loading/unloading dock in the storage facility. The shelving unit may be heavy due to multiple containers storing various items placed on the shelving unit. This existing solution is generally inefficient and often quickly causes fatigue to the human workers due to the significant physical effort to move and balance the heavy shelving unit. Some modern storage facilities use robotic devices to assist the human workers in operations of the shelf-transporting process. However, these robotic devices often require a large space to maneuver and perform their operations. Therefore, it is typically impossible or impractical for these robotic devices to handle and transport the shelving units located in tight or narrow areas (e.g., inside the delivery truck, at the corners in the storage facility, etc.).

SUMMARY

An automated guided vehicle (AGV) can be configured to perform particular operations or actions by virtue of having software, firmware, hardware, or a combination thereof installed on the AGV that in operation cause the AGV to perform the operations or actions. According to one innovative aspect of the subject matter described in this disclosure, an AGV includes: a lift platform including a support surface adapted to contact a surface of a shelving unit and provide support from underneath the shelving unit when the support surface is in an elevated position and the shelving unit is situated on the support surface, and a lifting mechanism including one or more motors coupled to the support surface and providing a first lifting force via a first portion of the support surface and a second lifting force via a second portion of the support surface, the first lifting force and the second lifting force vertically lifting or lowering the shelving unit via the support surface based on a weight distribution of the shelving unit on the support surface; and an AGV controller configured to control one or more operations of the AGV.

In general, another innovative aspect of the subject matter described in this disclosure may be embodied in methods comprising: aligning an automated guided vehicle (AGV) to a shelving unit at a first position relative to the shelving unit; relocating the AGV from the first position to a second position underneath a surface of the shelving unit; lifting the shelving unit using a lift platform of the AGV, the lift platform including a support surface coupled to a lifting mechanism, the lifting mechanism elevating the support surface to an elevated position to situate the shelving unit on the support surface, the lifting mechanism providing a first lifting force via a first portion of the support surface and a second lifting force via a second portion of the support surface, the first lifting force and the second lifting force vertically lifting the shelving unit on the support surface based on a weight distribution of the shelving unit on the support surface; and transporting the shelving unit situated on the support surface to a target position in an operating environment.

In general, another innovative aspect of the subject matter described in this disclosure may be embodied in methods comprising: aligning an automated guided vehicle (AGV) to a shelving unit in a vehicle at a first position relative to the shelving unit; relocating the AGV from the first position to a second position underneath a surface of the shelving unit; lifting the shelving unit using a lift platform of the AGV, the lift platform including a support surface coupled to a lifting mechanism, the lifting mechanism elevating the support surface to an elevated position to situate the shelving unit on the support surface, the lifting mechanism providing a first lifting force via a first portion of the support surface and a second lifting force via a second portion of the support surface, the first lifting force and the second lifting force vertically lifting the shelving unit on the support surface based on a weight distribution of the shelving unit on the support surface; transporting the shelving unit situated on the support surface to a target position in a facility; determining that the AGV reached the target position; and responsive to determining that the AGV reached the target position, lowering the support surface on which the shelving unit is situated from the elevated position to place the shelving unit at the target position in the facility.

These and other implementations of the AGV may each optionally include one or more of the following features: a first sensor coupled to the first portion of the support surface and a second sensor are coupled to the second portion of the support surface, the first sensor and the second sensor detecting the weight distribution of the shelving unit when the shelving unit is supported by the support surface; that the surface of the shelving unit is a bottom surface of the shelving unit, and the support surface is extended along at least a portion of the bottom surface of the shelving unit, the portion of the bottom surface of the shelving unit satisfying a length threshold associated with a length of the shelving unit; a drive unit includes one or more multi-directional wheels that are coupled to the lifting platform and rotatable around two or more axes to move the AGV; that the lift platform and the drive unit form a low-elevated and elongated body of the AGV, the low-elevated and elongated body of the AGV satisfy a dimension threshold associated with a space underneath the surface of the shelving unit; a guidance unit includes one or more sensors that detect one or more graphic markers in an operating environment to navigate the AGV in the operating environment; that the support surface is a flat, rectangular surface; aligning the AGV to the shelving unit at a first position relative to the shelving unit, relocating the AGV from the first position to a second position underneath the surface of the shelving unit, lifting the shelving unit using the first lifting force provided via the first portion of the support surface and the second lifting force provided via the second portion of the support surface, and transporting the shelving unit situated on the support surface to a target position; that aligning the AGV to the shelving unit includes detecting a first graphic marker associated with the first position relative to the shelving unit; that relocating the AGV from the first position to the second position includes determining the second position underneath the surface of the shelving unit at which a center point of the support surface of the lift platform is proximate to a center point of the surface of the shelving unit, and relocating the AGV from the first position to the second position;

that transporting the shelving unit includes, responsive to lifting the shelving unit, starting to move the AGV at an initial acceleration rate satisfying an acceleration rate threshold; determining that the AGV reached the target position, and responsive to determining that the AGV reached the target position, lowering the support surface on which the shelving unit is situated from the elevated position to place the shelving unit at the target position; and that the support surface is adaptively adjustable to a slope of the surface of the shelving unit.

These and other implementations of the method may each optionally include one or more of the following features: detecting, using a first sensor coupled to the first portion of the support surface and a second sensor coupled to the second portion of the support surface, the weight distribution of the shelving unit when the shelving unit is supported by the support surface; adjusting the support surface to a slope of the surface of the shelving unit; that the surface of the shelving unit is a bottom surface of the shelving unit, and the support surface supports the shelving unit from underneath the shelving unit when the shelving unit is situated on the support surface, the support surface extended along at least a portion of the bottom surface of the shelving unit and the portion of the bottom surface of the shelving unit satisfying a length threshold; that the AGV includes a drive unit comprising one or more multi-directional wheels that are coupled to the lifting platform and rotatable around two or more axes to move the AGV, and the lift platform and the drive unit form a low-elevated and elongated body of the AGV, the low-elevated and elongated body of the AGV satisfying a dimension threshold associated with a space underneath the surface of the shelving unit; that aligning the AGV to the shelving unit at the first position includes detecting a first graphic marker associated with the first position relative to the shelving unit, and transporting the shelving unit to the target position includes detecting one or more graphic markers in the operating environment to navigate the AGV to the target position.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 1A-1D respectively illustrate a top-view diagram, a front-view diagram, a side-view diagram, and a perspective diagram of an example shelf-transport AGV.

DESCRIPTION

Figure 1E:
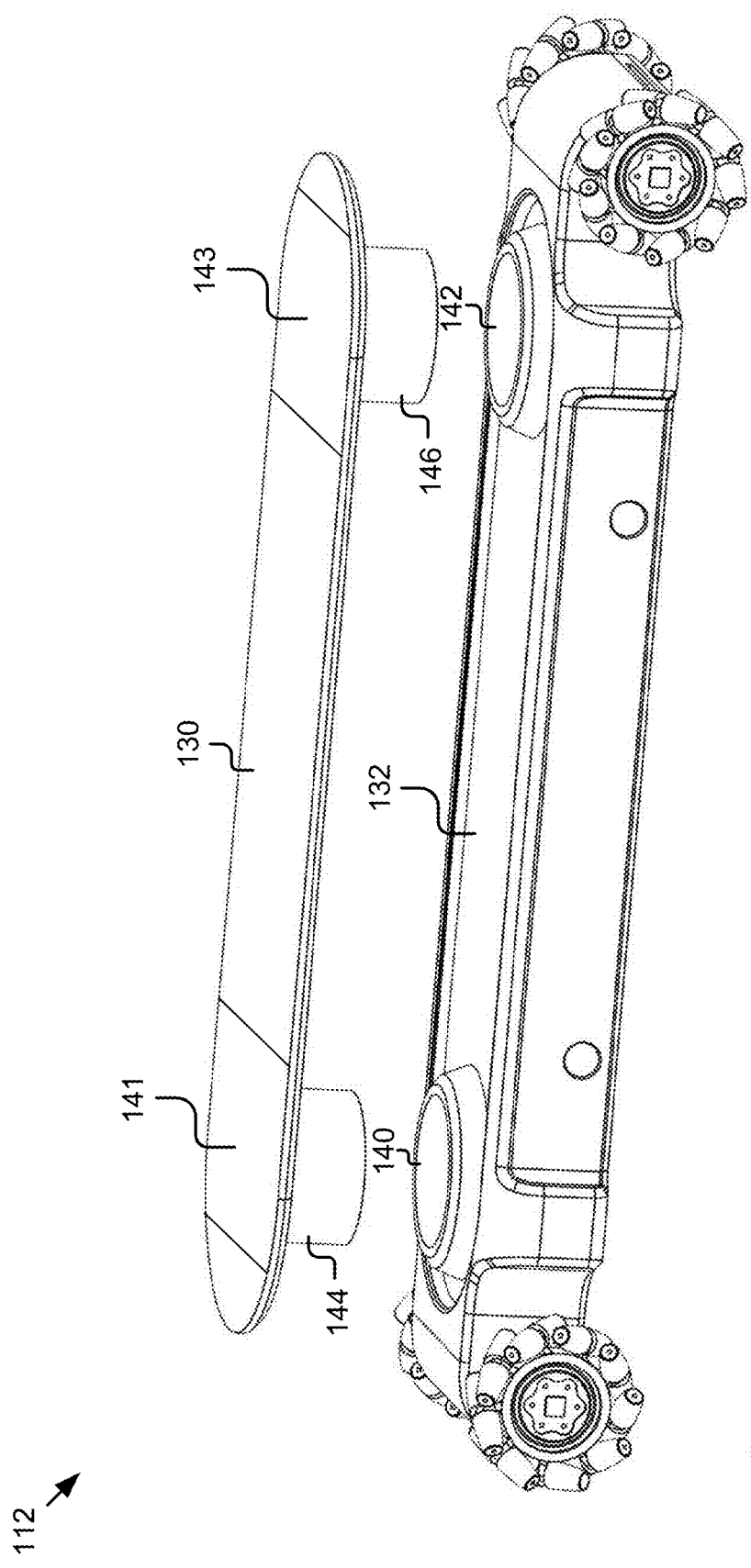
FIG. 1E illustrates an exploded-view diagram of an example shelf-transport AGV.

The technology presented in this disclosure improves upon existing approaches and is advantageous in a number of respects. For example, the Automated Guided Vehicle (AGV) described herein may have a low-elevated and elongated design that enables the AGV to slide underneath the shelving unit, lift the shelving unit up, and transport the shelving unit to a target position. The AGV only requires a limited space to operate and is therefore capable of handling and transporting shelving units located in tight or narrow areas (e.g., inside a fully loaded delivery vehicle). Furthermore, the AGV may also have one or more multi-directional wheels capable of rotating around multiple axes to move the AGV in multiple directions, and thus the AGV can flexibly maneuver in a compact space. As discussed above, the AGV can lift the shelving unit up to transport the shelving unit, and therefore the friction between the shelving unit and the floor surface during transportation can be avoided. In some implementations, the AGV can lift the shelving unit, so the present technology can also eliminate the need to provide the shelving unit with wheels, thereby avoiding unexpected rolling of the shelving unit, especially in case the shelving unit is placed inside a moving vehicle. As a further example, the AGV described herein may provide lifting forces via the support surface to vertically lift or lower the shelving unit based on the weight distribution of the shelving unit on the support surface. When the shelving unit is lifted, the AGV may start moving at a relatively low acceleration rate to transport the shelving unit. The AGV may also monitor a balance condition of the shelving unit during lifting, lowering, and transportation and adjust the lifting forces based on the balance condition. Accordingly, in some implementations, the AGV can advantageously balance a shelving unit situated on the AGV as the shelving unit is lifted and transported to its target position.

The technology described herein includes an example AGV that automatically transports the shelving unit between different locations. The AGV may be a robotic vehicle operating in the storage facility. As the AGV can transport a shelving unit, the AGV may be referred to herein as a shelf-transport AGV, although it should be understood that the AGV may transport other types of objects (e.g., pallets, containers, inventory items, etc.). In some embodiments, the shelving unit may be an object that is capable of accommodating items. In some embodiments, the shelving unit may include one or more shelves on which containers (e.g., storage boxes, mini-pallets, totes, etc.), which may hold various inventory items may be placed. Non-limiting examples of the shelving unit include, but are not limited to, a shelf, a rack, a cart, etc. In some embodiments, the shelving unit, when positioned on a floor surface, may have a space underneath the shelving unit that is in between the bottom surface of the shelving unit and the floor surface (e.g., the ground, floor, floor of the delivery vehicle, etc.). Depending on the embodiment, the shelving unit may or may not have wheels.

An example shelf-transport AGV 100 is depicted in FIGS. 1A-1D. FIG. 1A illustrates a top-view diagram 102, FIG. 1B illustrates a front-view diagram 104, FIG. 1C illustrates a side-view diagram 106, and FIG. 1D illustrates a perspective diagram 108 of the shelf-transport AGV 100. As illustrated in FIGS. 1A-1D, the shelf-transport AGV 100 may include a lift platform coupled to a drive unit. The lift platform may include a support surface 130 coupled to a lifting mechanism 132, and the drive unit may include one or more multi-directional wheels 110. In some embodiments, the shelf-transport AGV 100 may also include one or more indicators 120, a guidance unit (not shown), and/or an AGV controller 160 (not shown). Other components of the shelf-transport AGV 100 are also possible and contemplated.

In some embodiments, the components of the shelf-transport AGV 100 (e.g., the lift platform, the drive unit, etc.) may form a low-elevated and elongated body of the shelf-transport AGV 100. The low-elevated and elongated body of the shelf-transport AGV 100 may satisfy one or more dimension thresholds associated with the space underneath the shelving unit. For example, the shelf-transport AGV 100 may have the length, the width, and/or the height respectively lesser than the length, the width, and/or the height of the space underneath the bottom surface of the shelving unit being transported. As a result, the shelf-transport AGV 100 may have sufficient clearance between the bottom surface of the shelving unit and the shelf-transport AGV 100 to fit into the space underneath the shelving unit. Thus, the shelf-transport AGV 100 may slide between the legs and/or the wheels of the shelving unit to position itself underneath the shelving unit, lift the shelving unit to situate the shelving unit on the shelf-transport AGV 100, and transport the shelving unit situated on the shelf-transport AGV 100 to the target position. In some embodiments, the length and/or the width of the shelf-transport AGV 100 may substantially equal to the length and/or the width of the bottom surface of the shelving unit (e.g., 70% to 80% of the corresponding dimensions) in order to reliably support the shelving unit from underneath the shelving unit. As an example of the dimensions of the shelf-transport AGV 100, the shelf-transport AGV 100 may have a length of approximately 46 inches, a width of approximately 13 inches, and a height of approximately 6 to 7 inches. Other implementations of the dimensions of the shelf-transport AGV 100 are also possible and contemplated.

As discussed elsewhere herein, the shelf-transport AGV 100 may include a lift platform that comprises the support surface 130 coupled to the lifting mechanism 132. In some embodiments, the support surface 130 may be a flat surface on which the shelving unit may be situated and rest against the support surface 130. To support the shelving unit, the support surface 130 may be adapted to contact a surface of the shelving unit. In some embodiments, the surface of the shelving unit may be a bottom surface of the shelving unit. Thus, as the shelving unit is situated on the support surface 130, the support surface 130 may provide support to the shelving unit from underneath the shelving unit. In some embodiments, the lifting mechanism 132 may include one or more motors (not shown) coupled to the support surface 130. To support the shelving unit, the lifting mechanism 132 may actuate the one or more motors to elevate the support surface 130 to the elevated position at which the support surface 130 comes into contact with the bottom surface of the shelving unit, thereby situating the shelving unit on the support surface 130. As discussed above, when the support surface 130 is in the elevated position and the shelving unit is situated on the support surface 130, the support surface 130 may support the shelving unit from underneath the shelving unit via the bottom surface of the shelving unit, although other implementations are possible and contemplated herein.

In some embodiments, the lifting mechanism 132 may adjust the position of the support surface 130 to adapt to the shelving unit being transported. For example, the lifting mechanism 132 may adaptively adjust the support surface 130 to a slope of the surface of the shelving unit. In some embodiments, as the lifting mechanism 132 elevates the support surface 130 to an elevated position, the lifting mechanism 132 may also adjust the slope angle between the support surface 130 and the floor surface to be compatible with the slope angle between the bottom surface of the shelving unit and the floor surface, for example by lifting different portions of the support surface 130 different distances, as described in further detail elsewhere herein. These implementations may be advantageous because they may increase the stability of the shelving unit situated on the support surface 130.

As depicted in FIGS. 1A, 1B, and 1D, the support surface 130 may have an elongated shape, and thus the support surface 130 may be extended along at least a portion of the bottom surface of the shelving unit when the shelving unit is situated on the support surface 130. For example, when a shelving unit has a rectangular shape, the support surface 130 (and/or, in some instances, the shelf-transport AGV 100) may be elongated corresponding to the length of the shelving unit. For example, in order to stably support the shelving unit, the support surface 130 may be extended along at least a portion of the bottom surface of the shelving unit, and such portion of the bottom surface of the shelving unit may satisfy a length threshold (e.g., at least 1.2 m, 80% of the shelving unit length, etc.). In some embodiments, the shelf-transport AGV 100 may adjust the length of the support surface 130 to flexibly adapt to the length of the shelving unit being transported. For example, the support surface 130 may include one or more retractable portions at one or more distal ends of the support surface 130. The shelf-transport AGV 100 may project these retractable portions outward or retract these retractable portions inward to increase or decrease the length of the support surface 130 according to the length of the shelving unit. Other adjustments of the support surface 130 are also possible and contemplated.

As discussed elsewhere herein, the lifting mechanism 132 may include one or more motors coupled to the support surface 130. For example, the lifting mechanism 132 may be a dual-motor lift mechanism that includes two motors (e.g., stepper motors). Other numbers or types of motors (e.g., servo motors, brushless motors, etc.) are also possible and contemplated. In some embodiments, the one or more motors of the lifting mechanism 132 may have a motor size satisfying a motor size threshold (e.g., the height of each motor is lower than 5 inches) and have a motor power satisfying a motor power threshold (e.g., higher than 1 kW). As a result, the shelf-transport AGV 100 may be able to fit into the space underneath the shelving unit, while being capable of lifting and transporting a shelving unit with items placed thereon. It should be understood that instead of using motors, the lifting mechanism 132 may use a different mechanical or hydraulic lifting device to provide the lifting forces to the shelving unit.

In some embodiments, when the shelving unit is situated on the support surface 130, the one or more motors of the lifting mechanism 132 may provide a first lifting force via a first portion of the support surface 130 and a second lifting force via a second portion of the support surface 130. The first and second lifting forces may vertically lift or lower the shelving unit via the support surface 130 based on a weight distribution of the shelving unit on the support surface 130. In some embodiments, to detect the weight distribution of the shelving unit on the support surface 130, the lifting mechanism 132 may include a first sensor coupled to the first portion of the support surface 130 and a second sensor coupled to the second portion of the support surface 130. The sensors may be pressure sensors, resistance (e.g., electrical or mechanical resistance to the motor) sensors, etc.

An exploded-view diagram 112 of an example shelf-transport AGV 100 is depicted in FIG. 1E to illustrate example components of the shelf-transport AGV 100 in which the sensor(s), etc., may be integrated. As depicted in FIG. 1E, the support surface 130 may include a protrusion 144 at a first portion 141 that is proximate to a first end of the support surface 130, and a protrusion 146 at a second portion 143 that is proximate to a second end of the support surface 130. The lifting mechanism 132 may include a receiving channel 140 for receiving the protrusion 144 and a receiving channel 142 for receiving the protrusion 146, thereby engaging the support surface 130 with the lifting mechanism 132. In some embodiments, one or more motors and sensors may be integrated with or housed within each protrusion 144 or 146 and/or channel 140 or 142. For instance, a first sensor may be integrated in the receiving channel 140 of the lifting mechanism 132, and a second sensor may be integrated in the receiving channel 142 of the lifting mechanism 132. Alternatively, the first sensor may be integrated in the first portion 141 and/or the protrusion 144 of the support surface 130, and the second sensor may be integrated in the second portion 143 and/or the protrusion 146 of the support surface 130. The first sensor and the second sensor may be pressure sensor, motor load sensor, balance sensor, etc. Other types of sensors are also possible and contemplated. Similarly, the shelf-transport AGV 100 may have any number of motors, sensors, protrusions, channels, or lifting portions.

In some embodiments, the first sensor may monitor the weight of the shelving unit applied to the first portion 141 of the support surface 130, and the second sensor may monitor the weight of the shelving unit applied to the second portion 143 of the support surface 130, thereby detecting the weight distribution of the shelving unit on the support surface 130. The lifting mechanism 132 may then provide the first lifting force via the first portion 141 of the support surface 130, and provide the second lifting force via the second portion 143 of the support surface 130 based on the weight distribution of the shelving unit on the support surface 130. In some embodiments, the lifting force provided to the shelving unit via a particular portion of the support surface 130 may be directly proportional to the weight of the shelving unit applied to that portion. In some instances, the shelf transport AGV 100 may vary the lifting force to match a shifting weight balance of the shelving unit, for example, when the shelf transport AGV 100 accelerates or navigates up or down a slope.

As an example, the first sensor may detect the weight of the shelving unit applied to the first portion 141 of the support surface 130 to be 100 kg, and the second sensor may detect the weight of the shelving unit applied to the second portion 143 of the support surface 130 to be 250 kg. The shelf-transport AGV 100 may determine the weight difference between the weight of the shelving unit applied to the first portion 141 and the weight of the shelving unit applied to the second portion 143 (e.g., 150 kg). The shelf-transport AGV 100 may determine that the weight difference satisfies a weight difference threshold (e.g., higher than 50 kg), and thus determine that the shelving unit is situated on the support surface 130 in an unbalance manner. In this example, the lifting mechanism 132 may provide a first lifting force via the first portion 141 of the support surface 130, and provide a second lifting force via the second portion 143 of the support surface 130. The first lifting force may be proportional to the weight of the shelving unit applied to the first portion 141 of the support surface 130, and the second lifting force may be proportional to the weight of the shelving unit applied to the second portion 143 of the support surface 130, whether by matching the forces with the weights or by applying more force to a heavier side of the shelving unit. In some embodiments, the lifting mechanism 132 may lift a heavier side of the shelving unit farther than a lighter side of the shelving unit in order to shift the weight, and therefore the balance, of the shelving unit into a more stable position (e.g., where a center of gravity of the shelving unit is near the center of the support surface 130). As a result, the lifting mechanism 132 may lift the shelving unit in a balanced manner with the first lifting force and the second lifting force.

In some embodiments, during the transportation of the shelving unit to the target position, the first sensor and the second sensor may continue monitoring the weight of the shelving unit applied to the first portion and the second portion of the support surface 130. Thus, the shelf-transport AGV 100 may detect a change in the weight distribution of the shelving unit on the support surface 130, and dynamically adapt the first lifting force and the second lifting force during the transportation. For example, as the shelving unit is carried by the shelf-transport AGV 100, the shelf-transport AGV 100 may determine that the weight of the shelving unit applied to the second portion 143 of the support surface 130 increases while the weight of the shelving unit applied to the first portion 141 of the support surface 130 decreases (e.g., due to tilt of the shelving unit towards the second end of the support surface 130 that is proximate to the second portion 143, acceleration, etc.). In this example, the shelf-transport AGV 100 may decrease the first lifting force and/or lifting height (e.g., by changing the lifting force) provided via the first portion 141 of the support surface 130, and increase the second lifting force and/or lifting height provided via the second portion 143 of the support surface 130, thereby regaining the balance of the shelving unit situated on the support surface 130.

Referring back to FIGS. 1A-1D, as discussed elsewhere herein, the shelf-transport AGV 100 may include the drive unit comprising one or more multi-directional wheels 110, one or more power motors (not shown), and one or more driving actuators (not shown) that control the movement of the one or more multi-directional wheels 110. The multi-directional wheels 110 may be driven by the power motors and/or the driving actuators of the drive unit, and may be coupled to the lifting platform to move the shelf-transport AGV 100. In some embodiments, the multi-directional wheels 110 are capable of rotating around two or more axis. As a result, the multi-directional wheels 110 can move in any direction, thereby enabling the shelf-transport AGV 100 to perform various maneuvers to flexibly move and change direction in areas having limited space (e.g., inside a loaded box of a box truck or trailer). In some embodiments, the multi-directional wheels 110 may be Mecanum wheels; although, other types of wheel are also possible and contemplated.

In some embodiments, the shelf-transport AGV 100 may include a guidance unit (not shown) to allow the shelf transport AGV 100 to reposition itself or navigate in the operating environment. For example, the shelf-transport AGV 100 may rely on guidance provided by guidance unit to reposition itself relative to the shelving unit being transported. In another example, the shelf-transport AGV 100 may rely on the guidance unit to navigate from the initial position at which the shelving unit is initially placed to the target position of the shelving unit in the storage facility. In some embodiments, the guidance unit may include one or more sensors. Examples sensors of the guidance unit include, but are not limited to, vision sensors (e.g., camera, etc.), optical reader devices (e.g., marker scanner, etc.), radio beacon or tag readers, etc. Other types of sensors are also possible and contemplated.

In some embodiments, the optical sensors may be image sensors capable of recording images (e.g., video or still images), recording frames of a video stream, etc. In some embodiments, the optical sensors may be mounted on the shelf-transport AGV 100 and capture images of the surrounding environment within their optical range. In some embodiments, the shelf-transport AGV 100 may analyze the captured images to determine its current position and/or to detect various objects present in the surrounding environment (e.g., shelving units, human workers, other AGVs, etc.). The shelf-transport AGV 100 may then adaptively reposition itself relative to the detected object, and/or determine a travel path to navigate through the detected objects to a target position.

In some embodiments, the reader devices may be optical scanners capable of performing read operations to read graphic markers. Non-limiting examples of a graphic marker include, but are not limited to, a barcode, Quick Response (QR) code, Radio Frequency Identification (RFID) label, etc. In some embodiments, the graphic marker may be attached to various objects and/or various locations in the operating environment. For example, the graphical marker may be attached to shelving units, containers, inventory items, AGVs, the floor, walls, etc. In another example, the graphical marker may be attached to the designated position (e.g., on the floor, wall, ceiling, etc.) at which shelving units are placed in a delivery vehicle, the target position to which the shelving unit is transported in the storage facility, etc. In some embodiments, the reader devices may read the graphic marker to obtain the unique identifier (ID) of the object and/or location to which the graphical marker is attached. The shelf-transport AGV 100 may then rely on these unique ID to identify the shelving unit to be transported, align itself to the shelving unit, determine whether the target position of the shelving units is reached, navigate between different locations in the storage facility, etc.

In some embodiments, the shelf-transport AGV 100 may include an indicator coupled to the lift platform. The indicator may project a signal that indicates the shelf-transport AGV 100 in an operating environment, thereby notifying the presence and/or the current operation of the shelf-transport AGV 100 to other entities located proximate to the shelf-transport AGV 100 in the operating environment. The indicator may allow the human workers and other AGVs located nearby to be aware of the shelf-transport AGV 100 despite its low-elevated and elongated body that may not attract attention. For example, the shelf-transport AGV 100 may include the light indicators 120 coupled to the lifting mechanism 132 as depicted in FIGS. 1B and 1D. The light indicators 120 may be Light Emitting Diode (LED) indicators that emit various types of light (e.g., blinking light, light in different colors) corresponding to various types of motion performed by the shelf-transport AGV 100 (e.g., proceeding straight, turning left, rotating, etc.). Other types of indicators may transmit their signals using sound, lasers, radio transmission to another device (e.g., a vibrating belt, smart phone, wearable smart device), etc., are also possible and contemplated.

Figure 1F:
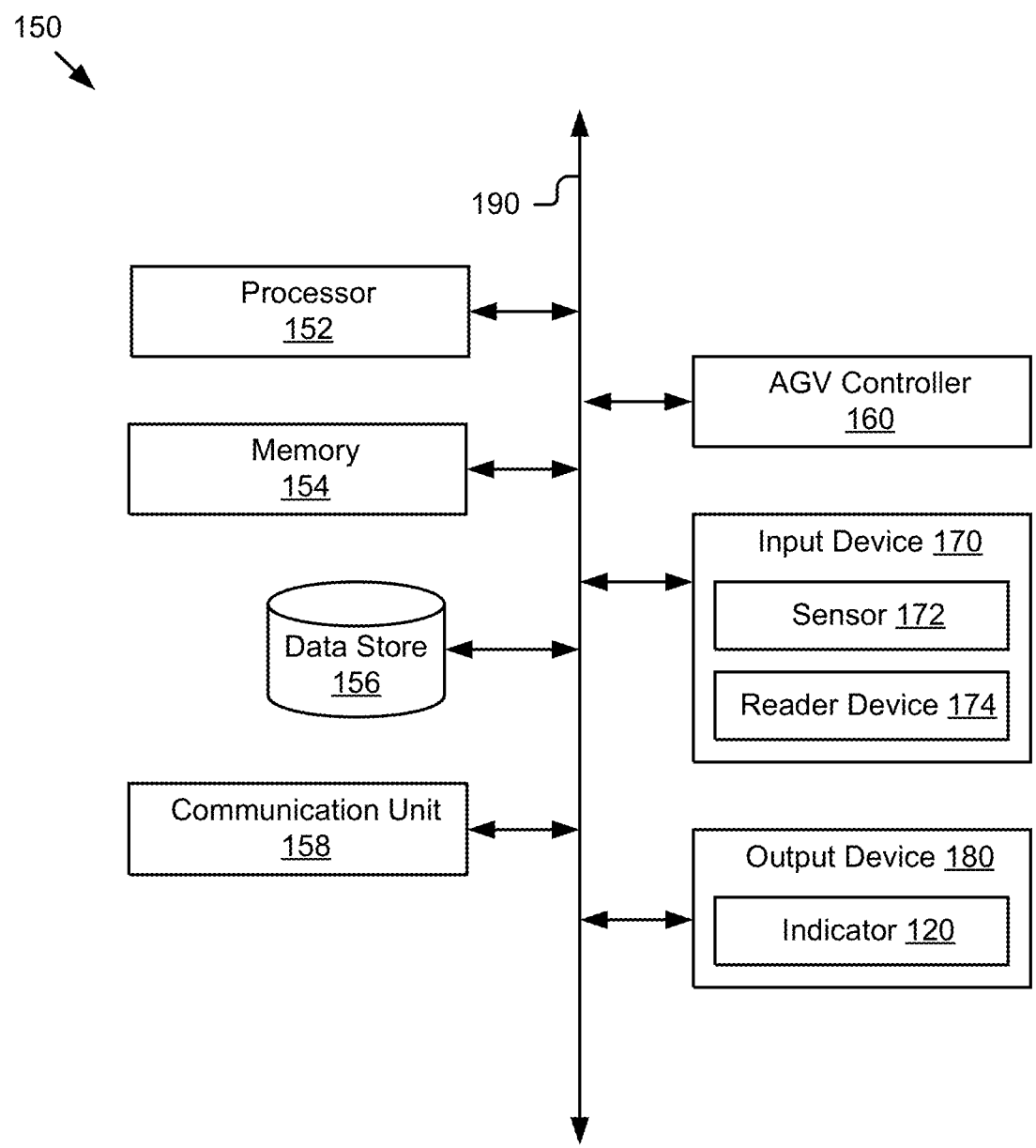
FIG. 1F is a block diagram of an example computing device.

FIG. 1F illustrates a computing device 150 representing an example architecture of a shelf-transport AGV 100. As depicted, the computing device 150 may include a processor 152, a memory 154, a data store 156, a communication unit 158, the AGV controller 160, one or more input devices 170, and one or more output devices 180. The components of the computing device 150 may be communicatively coupled by a bus 190. The computing device 150 depicted in FIG. 1F is provided by way of example and it should be understood that it may take other forms and include additional or fewer components without departing from the scope of the present disclosure. For example, various components of the computing device 150 may be coupled for communication using a variety of communication protocols and/or technologies including, for example, communication buses, software communication mechanisms, computer networks, etc. While not shown, the computing device 150 may include various operating systems, sensors, additional processors, and other physical configurations. Although FIG. 1F only illustrates a single processor 152, memory 154, data store 156, etc., it should be understood that the computing device 150 may include a plurality of instances of one or more of these components.

The processor 152 may execute software instructions by performing various input, logical, and/or mathematical operations. The processor 152 may have various computing architectures to process data signals including, for example, a complex instruction set computer (CISC) architecture, a reduced instruction set computer (RISC) architecture, and/or an architecture implementing a combination of instruction sets. The processor 152, which may include one or more processors, may be physical and/or virtual, and may include a single core or plurality of processing units and/or cores. In some embodiments, the processor 152 may be capable of generating and providing electronic signals to other computing entities (e.g., servers, other AGVs, etc.), performing complex tasks such as image processing, AGV alignment and/or navigation, etc. In some embodiments, the processor 152 may be coupled to the memory 154 via the bus 190 to access data and instructions therefrom and store data therein. The bus 190 may couple the processor 152 to the other components of the computing device 150 including, for example, the AGV controller 160, the memory 154, the data store 156, the communication unit 158, the input devices 170, and/or the output devices 180.

The memory 154 may store and provide access to data to the other components of the computing device 150. The memory 154 may be included in a single computing device or a plurality of computing devices. In some embodiments, the memory 154 may store instructions and/or data that may be executed by the processor 152. For example, the memory 154 may store computer logic executed by the AGV controller 160, depending on the configuration. The memory 154 is also capable of storing other instructions and data, including, for example, an operating system, hardware drivers, software applications, databases, etc. The memory 154 may be coupled to the bus 190 for communication with the processor 152 and other components of computing device 150. The memory 154 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor 152. In some embodiments, the memory 154 may include one or more of volatile memory and non-volatile memory (e.g., RAM, ROM, hard disk, optical disk, etc.). It should be understood that the memory 154 may be a single device or may include multiple types of devices and configurations.

The bus 190 may include a communication bus for transferring data between components of a computing device or between computing devices, a network bus system including a network or portions thereof, a processor mesh, a combination thereof, etc. In some embodiments, the server, the AGV controller 160, and various other components operating on the computing device 150 (operating systems, device drivers, etc.) may cooperate and communicate via a communication mechanism included in or implemented in association with the bus 190. The software communication mechanism may include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. In some embodiments, any or all of the communication can be secure (e.g., SSH, HTTPS, etc.).

The communication unit 158 may include one or more interface devices (I/F) for wired and wireless connectivity among the computing entities of the system (e.g., the server, the AGVs, etc.). For example, the communication unit 158 may include, but is not limited to, various types known connectivity and interface options. The communication unit 158 may be coupled to other components of the computing device 150 via the bus 190. The communication unit 158 may be coupled to a network (e.g., the Internet, an intranet, etc.), depending on the configuration. In some embodiments, the communication unit 158 may link the processor 152 to the network, which may in turn be coupled to other processing systems. The communication unit 158 may provide other connections to a network, servers, and/or computing devices using various standard communication protocols.

The data store 156 may include a non-transitory storage medium that stores various types of data and provides access to the data. The data stored by the data store 156 may be organized and queried using various criteria. For example, the data store 156 may include data tables, databases, or other organized collections of data. In some embodiments, the data store 156 may be included in the computing device 150 or in another computing system and/or storage system distinct from but coupled to or accessible by the computing device 150. In some embodiments, the data store 156 may be incorporated with the memory 154 or may be distinct therefrom. In some embodiments, the data store 156 may store data associated with a database management system (DBMS) operable on the computing device 150. For example, the DBMS could include a structured query language (SQL) DBMS, a NoSQL DBMS, various combinations thereof, etc. In some instances, the DBMS may store data in multi-dimensional tables comprised of rows and columns, and manipulate, e.g., insert, query, update and/or delete, rows of data using programmatic operations.

In some embodiments, the data stored by the data store 156 may include, but is not limited to, AGV data, shelving unit data, location data, map data, guidance marker data, etc. For example, the data store 156 may store the AGV ID of the shelf-transport AGV 100, the shelving unit ID of the shelving unit transported by the shelf-transport AGV 100, dimensions of the shelving unit, an initial position and a target position of the shelving unit, etc. The data store 156 may also store the current location of the shelf-transport AGV 100, the current location of other AGVs in the operating environment, the map data describing the operating environment (e.g., the facility map of the storage facility), etc. Other types of data are also possible and contemplated.

The input devices 170 may include any device for inputting information into the computing device 150. The input devices 170 may be coupled to the computing device 150 directly or through intervening Input/Output (I/O) controllers. In some embodiments, the input devices 170 may include one or more peripheral devices such as a touchscreen display, a keyboard (e.g., a virtual keyboard), a pointing device (e.g., a virtual mouse device), a microphone for receiving user input via speech, etc. As depicted in FIG. 1F, the input devices 170 may include one or more sensors 172. Non-limiting examples of the sensors 172 include, but are not limited to, vision sensors (e.g., camera and/or other image/video capture devices), obstacle sensors, distance sensors, pressure sensors, motor load sensors, balance sensors, etc. As depicted in FIG. 1F, the input device 170 may also include a reader device 174, which, as discussed elsewhere herein, may be a marker scanner that can read the graphic markers attached to various objects and/or locations. Non-limiting examples of the reader device 174 include, but are not limited to, a barcode scanner, QR code scanner, RFID reader, etc. Other types of input device are also possible and contemplated.

The output devices 180 may include any device capable of outputting information from the computing device 150. The output devices 180 may be coupled to the computing device 150 directly or through intervening I/O controllers. In some embodiments, the output devices 180 may include one or more peripheral devices such as a display (e.g., touchscreen display, Liquid Crystal Display (LCD), etc.), an audio reproduction device (e.g., a speaker), etc. As depicted in FIG. 1F, the output device 180 may include one or more indicators 120. As discussed elsewhere herein, the indicators 120 may project one or more signals to indicate the presence and/or the current operation of the shelf-transport AGV 100 to other entities located proximate to the shelf-transport AGV 100. Non-limiting examples of the indicators 120 include, but are not limited to, lights, speakers, etc. Other types of output device are also possible and contemplated.

The AGV controller 160 may include computer logic executable by the processor 152 or by the server to control one or more operations of the shelf-transport AGV 100. For example, the AGV controller 160 may control the operations of the shelf-transport AGV 100 to transport the shelving unit between different locations. In some embodiments, the AGV controller 160 may be implemented using software executable by one or more processors of one or more computer devices, using hardware, such as, but not limited to a field-programmable gate array (FPGA), an application-specific integrated circuit (ASIC), etc., and/or a combination of hardware and software, etc. In some embodiments, the AGV controller 160 may communicate with other components of the computing device 150 via the bus 190 and/or the processor 152, and communicate with other entities of the system via the network. In some embodiments, the AGV controller 160 may be a set of instructions executable by the processor 152 to provide its functionality. In further embodiments, the AGV controller 160 may be storable in the memory 154 and accessible and executable by the processor 152 to provide its functionality. In any of the foregoing embodiments, the AGV controller 160 may be adapted for cooperation and communication with the processor 152 and other components of the computing device 150. For example, the AGV controller 160 may receive input data from one or more input devices 170 (e.g., a captured image, shelving unit ID, initial position or target position of the shelving unit, graphic marker ID, etc.), process the input data, and provide one or more outputs via one or more output devices 180 (e.g., indication signal, transportation complete notification, etc.). Example operations of the AGV controller 160 are described in detail below with reference to at least FIGS. 2-4K.

Figure 2:
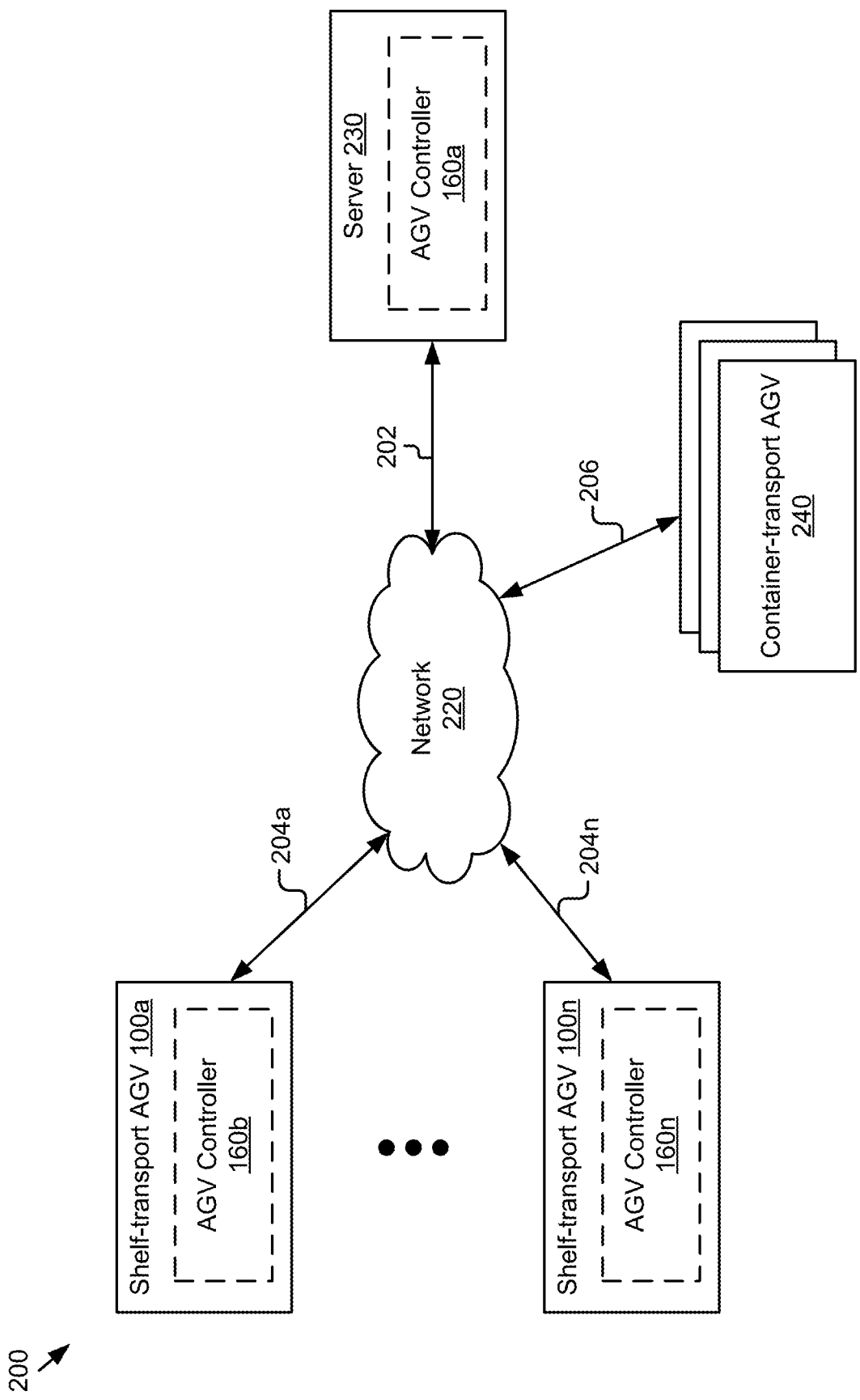
FIG. 2 is a block diagram of an example system for automatically transporting a shelving unit using a shelf-transport AGV.

FIG. 2 is a block diagram of an example system 200 for automatically transporting a shelving unit using a shelf-transport AGV 100. In FIG. 2, and the other figures, a letter after a reference number, e.g., "100a," represents a reference to the element having that particular reference number. A reference number in the text without a following letter, e.g., "100," represents a general reference to instances of the element bearing that reference number. As depicted, the system 200 includes a server 230, one or more shelf-transport AGVs 100, and one or more container-transport AGVs 240 coupled for electronic communication via a network 220. It should be understood that the system 200 depicted in FIG. 2 is provided by way of example, and that the system 200 may include additional and/or fewer components, combine components, and/or divide one or more of the components into additional components, etc. For example, the system 200 may include any number of servers 230, shelf-transport AGVs 100, or container-transport AGVs 240. In some embodiments, the shelf-transport AGVs 100 may transport the shelving units in the operating environment as discussed elsewhere herein. The container-transport AGVs 240 may transport the containers (e.g., box, tote, mini-pallet, etc.) in the operating environment. It should be understood that the system 200 may also include other types of AGVs that perform other tasks in the operating environment.

The network 220 may be a conventional type, wired and/or wireless, and may have numerous different configurations including a star configuration, token ring configuration, or other configurations. Furthermore, the network 220 may include one or more local area networks (LAN), wide area networks (WAN) (e.g., the Internet), personal area networks (PAN), cellular networks, public networks, private networks, virtual networks, virtual private networks, peer-to-peer networks, near field networks (e.g., Bluetooth, NFC, etc.), and/or other interconnected data paths across which multiple devices may communicate.

The network 220 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 220 is a wireless network using a connection such as DSRC (Dedicated Short Range Communication), WAVE, 802.11p, a 3G, 4G, 5G+ network, WiFi™, satellite networks, or other suitable networks. Although FIG. 2 illustrates a single block for the network 220 that couples to the server 230, the shelf-transport AGVs 100, and the container-transport AGVs 240, it should be understood that the network 220 may in practice comprise any number of combination of networks, as noted above.

As depicted in FIG. 2, the server 230, the shelf-transport AGVs 100, and the container-transport AGVs 240 may be communicatively coupled to the network 220, as respectively represented by signal lines 202, 204, and 206. Thus, the server 230, the shelf-transport AGVs 100, and the container-transport AGVs 240 may send and receive data to and from other entities of the system 200 via the network 220. As illustrated, the AGV controller 160 may be implemented in a shelf-transport AGV 100 and/or in the server 230. In some embodiments, if the AGV controller 160 is implemented in the shelf-transport AGV 100, the AGV controller 160 may be configured to communicate with other components of the shelf-transport AGV 100 to control various operations of the shelf-transport AGV 100 via the bus 190 and/or the processor 152. If the AGV controller 160 is implemented in the server 230, the AGV controller 160 may be configured to communicate with the shelf-transport AGV 100 to control various operations of the shelf-transport AGV 100 via the network 220. In some embodiments, the AGV controller 160 implemented in the server 230 may control and/or coordinate the operations of multiple shelf-transport AGVs 100 in the operating environment.

Figure 3:
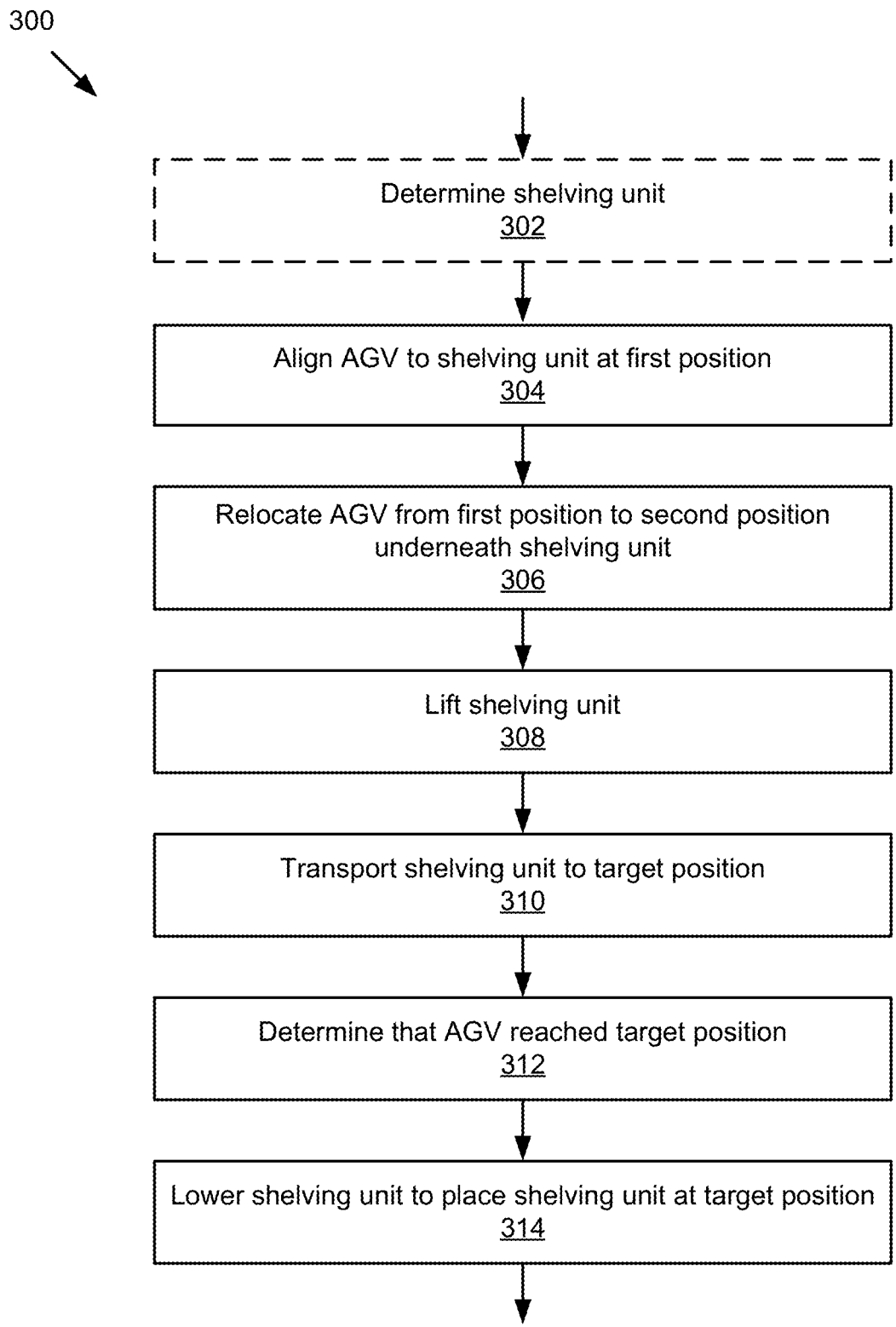
FIG. 3 is a flowchart of an example method for transporting the shelving unit.

FIG. 3 illustrates an example method 300 for transporting a shelving unit between different locations in an operating environment. In some embodiments, the method 300 may be performed by the shelf-transport AGV 100 as it is controlled by the AGV controller 160. In block 302, the AGV controller 160 may optionally determine the shelving unit to be transported by the shelf-transport AGV 100. In some embodiments, the reader device 174 of the shelf-transport AGV 100 may scan the graphic markers (e.g., QR codes) attached to the shelving units to obtain the shelving unit IDs of the shelving units. The AGV controller 160 may then determine a particular shelving unit to be transported among these shelving units based on the shelving unit IDs. In some embodiments, the AGV controller 160 may determine to transport a shelving unit that has a lowest distance to a point of reference. As an example, the shelf-transport AGV 100 may unload multiple shelving units from a delivery vehicle to the target positions of the shelving units on the floor surface of the storage facility. In this example, as the shelf-transport AGV 100 enters the delivery vehicle and relocates to the designated area at which the shelving units are placed in the delivery vehicle, the AGV controller 160 may determine the shelving unit that has the lowest distance to the entrance door of the delivery vehicle, and determine the shelving unit being transported to be this shelving unit. Other implementations for determining the shelving unit being transported by the shelf-transport AGV 100 are also possible and contemplated.

FIGS. 4A-4K illustrate an example scenario in which a shelf-transport AGV 100 transports a shelving unit from an initial position to a target position, and the operations illustrated in FIGS. 4A-4K are described along with the method 300 in FIG. 3. In this example, as depicted in stage 400 in FIG. 4A, the AGV controller 160 may determine that the shelving unit 402a has the lowest distance to the current position of the shelf-transport AGV 100, and thus determine that the shelving unit to be transported is the shelving unit 402a.

In block 304, the AGV controller 160 may align the shelf-transport AGV 100 to the shelving unit at a first position relative to the shelving unit. In some embodiments, the first position may be located along an edge of the shelving unit and have a distance between the first position and the edge of the shelving unit satisfying a distance threshold (e.g., less than 15 cm). In some embodiments, the first position may be indicated by a first graphic marker (e.g., QR code), and thus the reader device 174 of the shelf-transport AGV 100 may detect the first graphic marker associated with the first position to align the shelf-transport AGV 100 to the shelving unit. The first graphic marker may be attached to the shelving unit or to the floor surface proximate to the shelving unit (e.g., the vehicle floor of the delivery vehicle, the ground surface of the loading dock, etc.) such that when the reader device 174 of the shelf-transport AGV 100 detects the first graphic marker, the shelf-transport AGV 100 is at the first position relative to the shelving unit. In other embodiments, the vision sensor of the shelf-transport AGV 100 may capture one or more images of the shelving unit from the perspective of the shelf-transport AGV 100. The AGV controller 160 may then determine the first position relative to the shelving unit based on the captured images, and relocate the shelf-transport AGV 100 to the first position to align the shelf-transport AGV 100 to the shelving unit. Other implementations for aligning the shelf-transport AGV 100 to the shelving unit are also possible and contemplated.

Figure 4A:
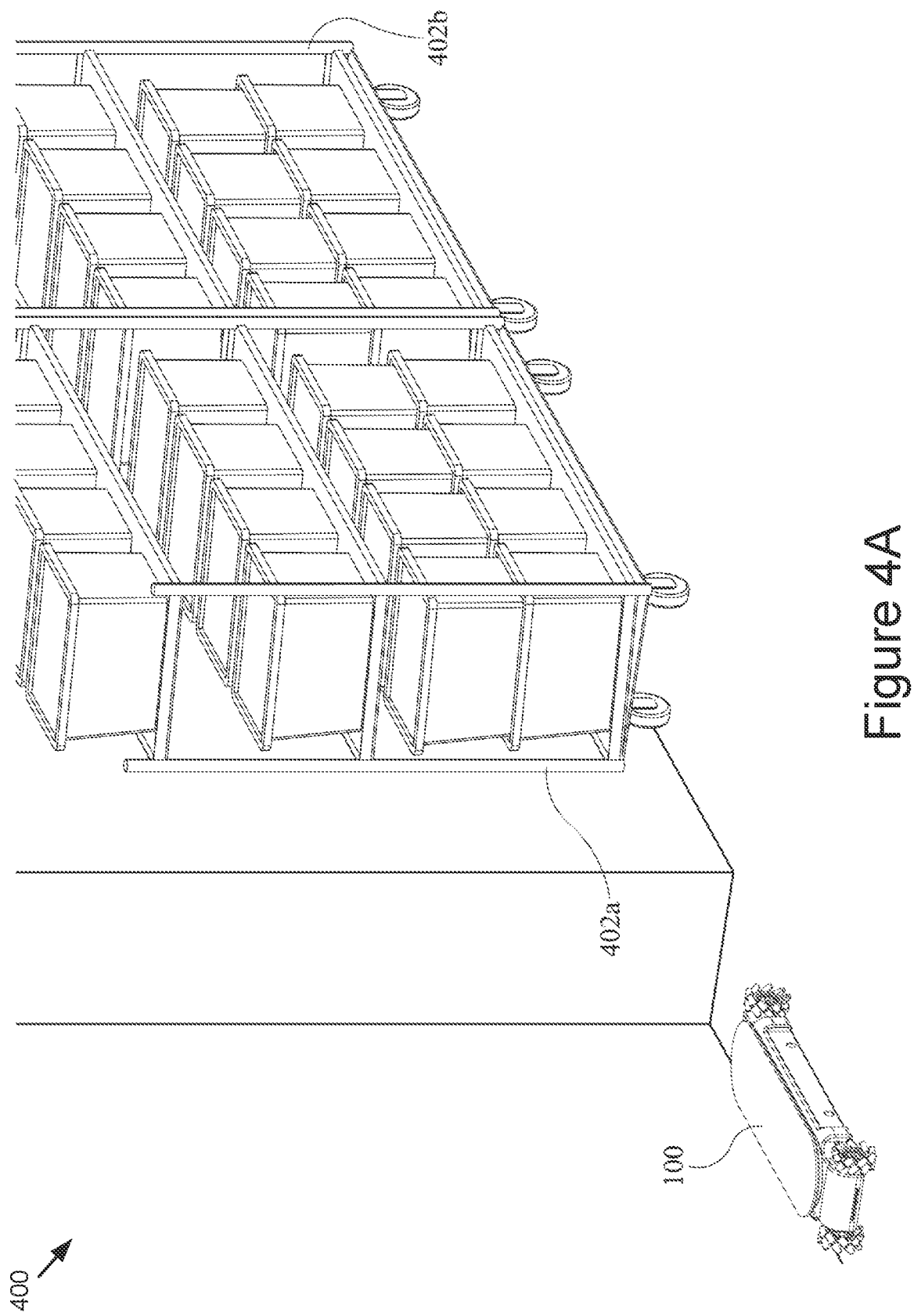
FIG. 4A-4K illustrate an example scenario in which an example shelf-transport AGV transports the shelving unit to a target position of the shelving unit.
Figure 4B:
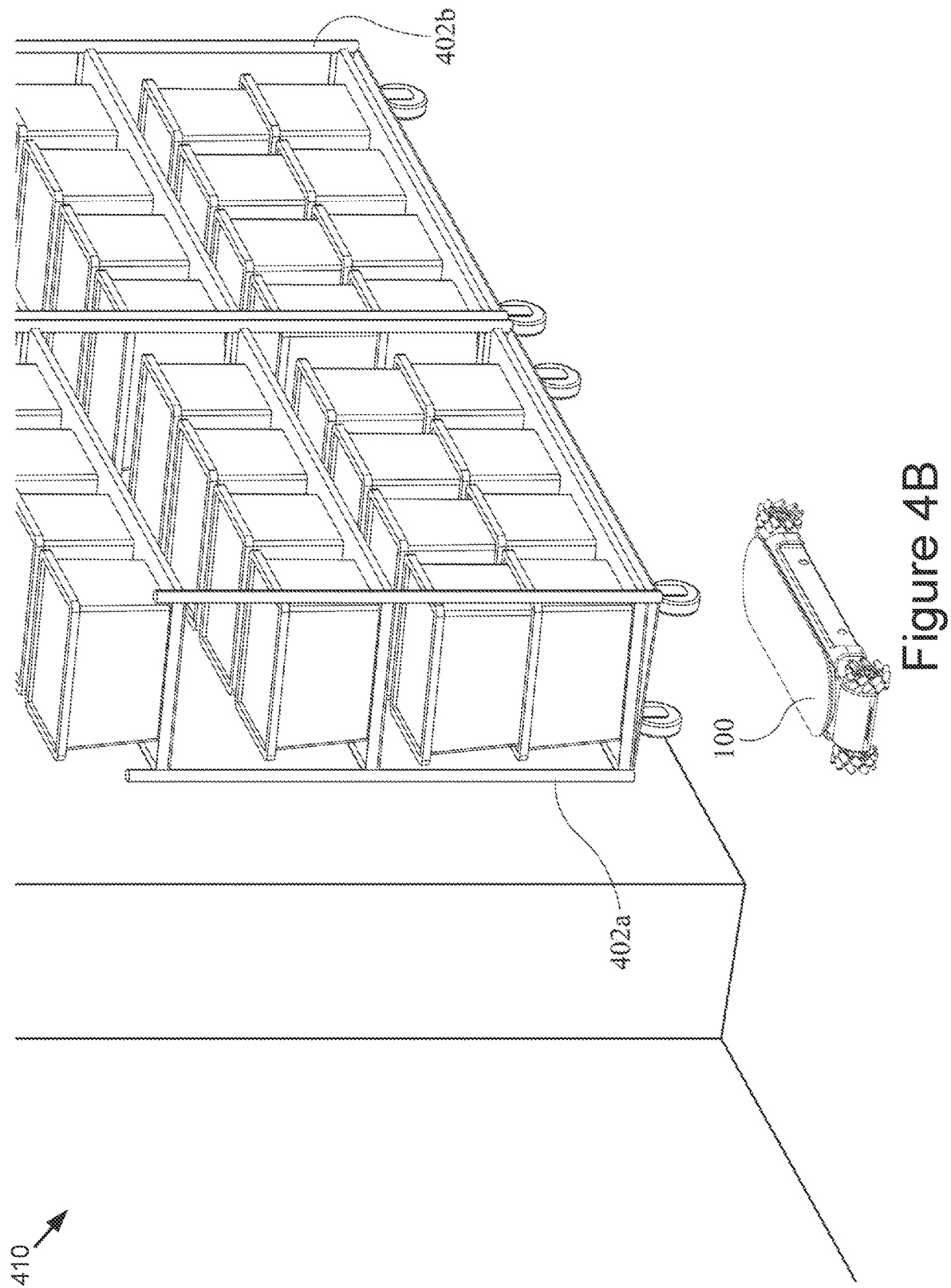
Figure 4C:
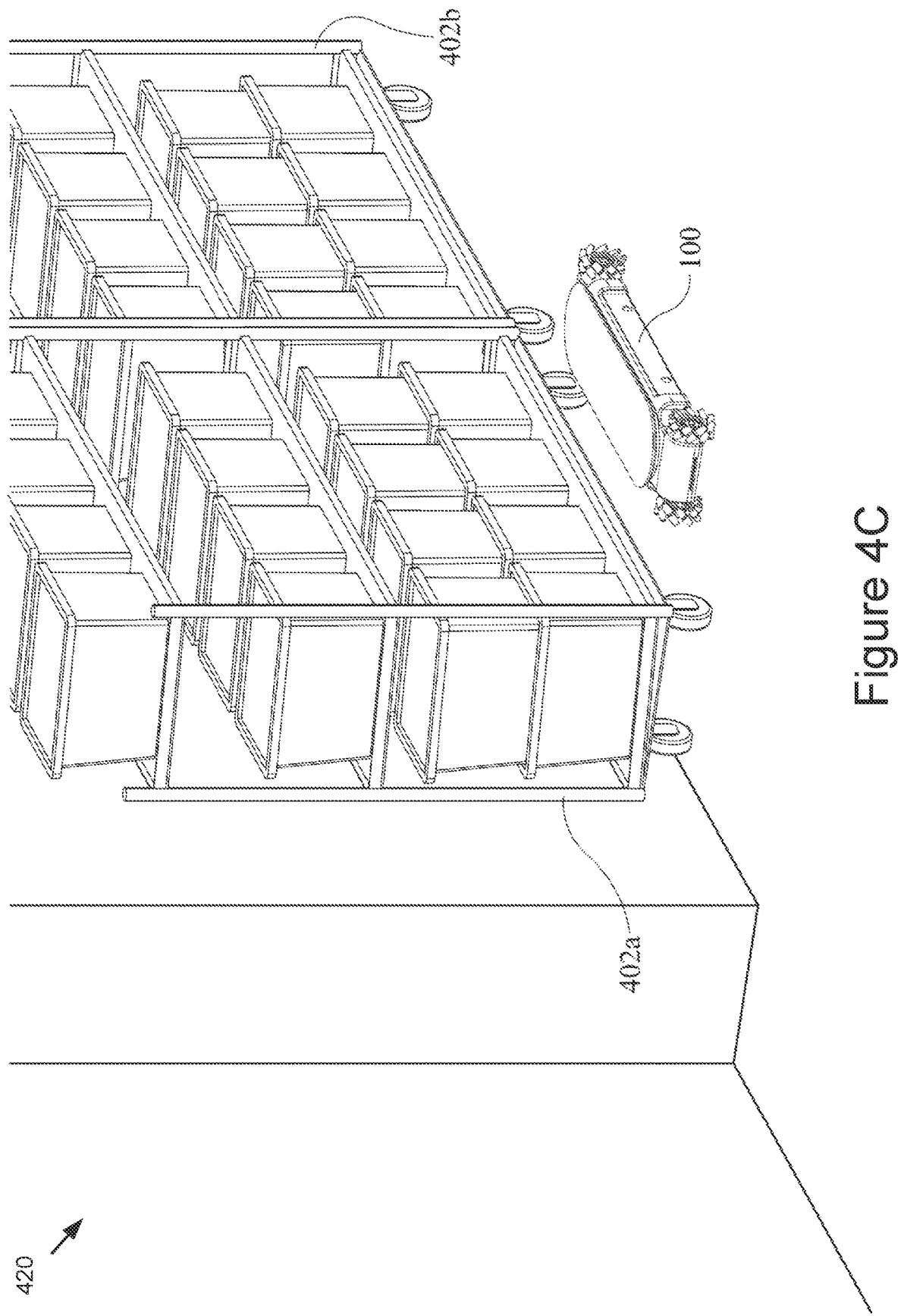

Continuing the example depicted in FIGS. 4A-4K, in the stage 410 illustrated in FIG. 4B, the AGV controller 160 may relocate the shelf-transport AGV 100 from its original position towards the shelving unit 402a. In the stage 420 illustrated in FIG. 4C, the AGV controller 160 may align the shelf-transport AGV 100 to the shelving unit 402a at the first position along the length of the shelving unit 402a and proximate to the shelving unit 402a.

In block 306, the AGV controller 160 may relocate the shelf-transport AGV 100 from the first position to a second position underneath the shelving unit. In some embodiments, the AGV controller 160 may determine the second position underneath the surface of the shelving unit at which a center point of the support surface 130 of the lift platform is proximate to a center point of the surface of the shelving unit. The AGV controller 160 may then relocate the shelf-transport AGV 100 from the first position to the second position. This configuration may be advantageous, because the balance of the shelving unit on the support surface 130 can be improved due to the proximity between the center point of the surface of the shelving unit and the center point of the support surface 130 on which the shelving unit will be situated.

In some embodiments, to determine the second position underneath the shelving unit, the AGV controller 160 may retrieve or determine the size of the bottom surface of the shelving unit, estimate the center point of the bottom surface of the shelving unit, and determine the second position at which the distance between the center point of the bottom surface of the shelving unit and the center point of the support surface 130 of the shelf-transport AGV 100 satisfies a proximity threshold (e.g., less than 2 cm). In some embodiments, the second position may be indicated by a second graphic marker attached to the bottom surface of the shelving unit such that when the reader device 174 of the shelf-transport AGV 100 detects the second graphic marker, the shelf-transport AGV 100 is at the second position at which the center point of the bottom surface of the shelving unit is proximate to the center point of the support surface 130 of the shelf-transport AGV 100. Other implementations for determining the second position underneath the shelving unit are also possible and contemplated.

Figure 4D:
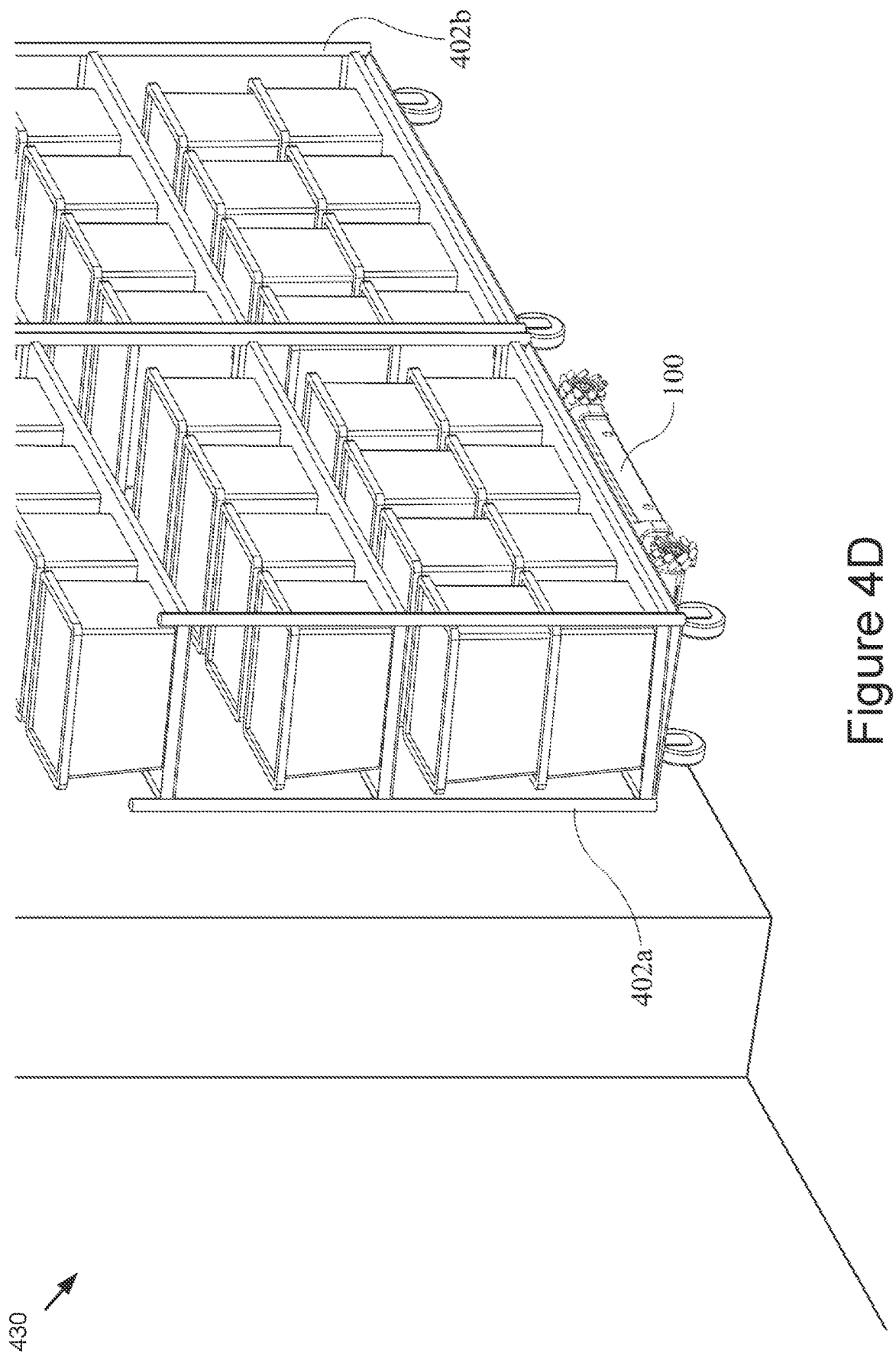

Continuing the example depicted in FIGS. 4A-4K, in the stage 430 illustrated in FIG. 4D, the AGV controller 160 may relocate the shelf-transport AGV 100 from the first position along the length of the shelving unit 402a and proximate to the shelving unit 402a to the second position underneath the shelving unit 402a.

In block 308, when the shelf-transport AGV 100 is relocated to the second position underneath the shelving unit, the shelf-transport AGV 100 may lift the shelving unit using the lift platform of the shelf-transport AGV 100. In some embodiments, to lift the shelving unit, the lifting mechanism 132 may actuate its motors to elevate the support surface 130 to the elevated position at which the support surface 130 comes into contact with the bottom surface of the shelving unit, thereby situating the shelving unit on the support surface 130. In some embodiments, the lifting mechanism 132 may adjust the support surface 130 to the slope of the bottom surface of the shelving unit to eliminate the gap that may exist between the support surface 130 and the bottom surface of the shelving unit, which embodiment may be advantageous because the shelving unit can stably rest against the support surface 130, especially in case the bottom surface of the shelving unit is tilted. In some embodiments, the lifting mechanism 132 may also adjust the support surface 130 to the length of the bottom surface of the shelving unit. For example, the lifting mechanism 132 may project or retract one or more retractable portions of the support surface 130 to adjust the length of the support surface 130 relative to the length of the bottom surface of the shelving unit. As the shelving unit is situated on the support surface 130, the support surface 130 may support the shelving unit from underneath the shelving unit via the bottom surface of the shelving unit. The support surface 130 may also be extended along at least a portion of the bottom surface of the shelving unit, and such portion of the bottom surface of the shelving unit may satisfy a length threshold (e.g., at least 80% of the length of the shelving unit, etc.), which embodiment may be advantageous because it can improve the stability of the shelving unit on the support surface 130.

In some embodiments, when the shelving unit is situated on the support surface 130, the AGV controller 160 may detect the weight distribution of the shelving unit on the support surface 130 using the first sensor coupled to the first portion of the support surface 130 and the second sensor coupled to the second portion of the support surface 130. As discussed elsewhere herein, the first sensor may monitor the weight of the shelving unit applied to the first portion of the support surface 130, and the second sensor may monitor the weight of the shelving unit applied to the second portion of the support surface 130. The AGV controller 160 may detect the weight distribution of the shelving unit on the support surface 130 based on the weight of the shelving unit applied to these different portions. In some embodiments, to lift the shelving unit, the lifting mechanism 132 may actuate its motors to provide a first lifting force via the first portion of the support surface 130 and a second lifting force via the second portion of the support surface 130. The first lifting force and the second lifting force may vertically lift the shelving unit via the support surface 130 based on the weight distribution of the shelving unit on the support surface 130, as described in detail above. In some embodiments, the first lifting force may be directly proportional to the weight of the shelving unit applied to the first portion of the support surface 130, and the second lifting force may be directly proportional to the weight of the shelving unit applied to the second portion of the support surface 130. As a result, the first lifting force and the second lifting force may lift the shelving unit up in a balanced manner. In some embodiments, the first lifting force and the second lifting force may lift the shelving unit completely off the floor surface.

Figure 4E:
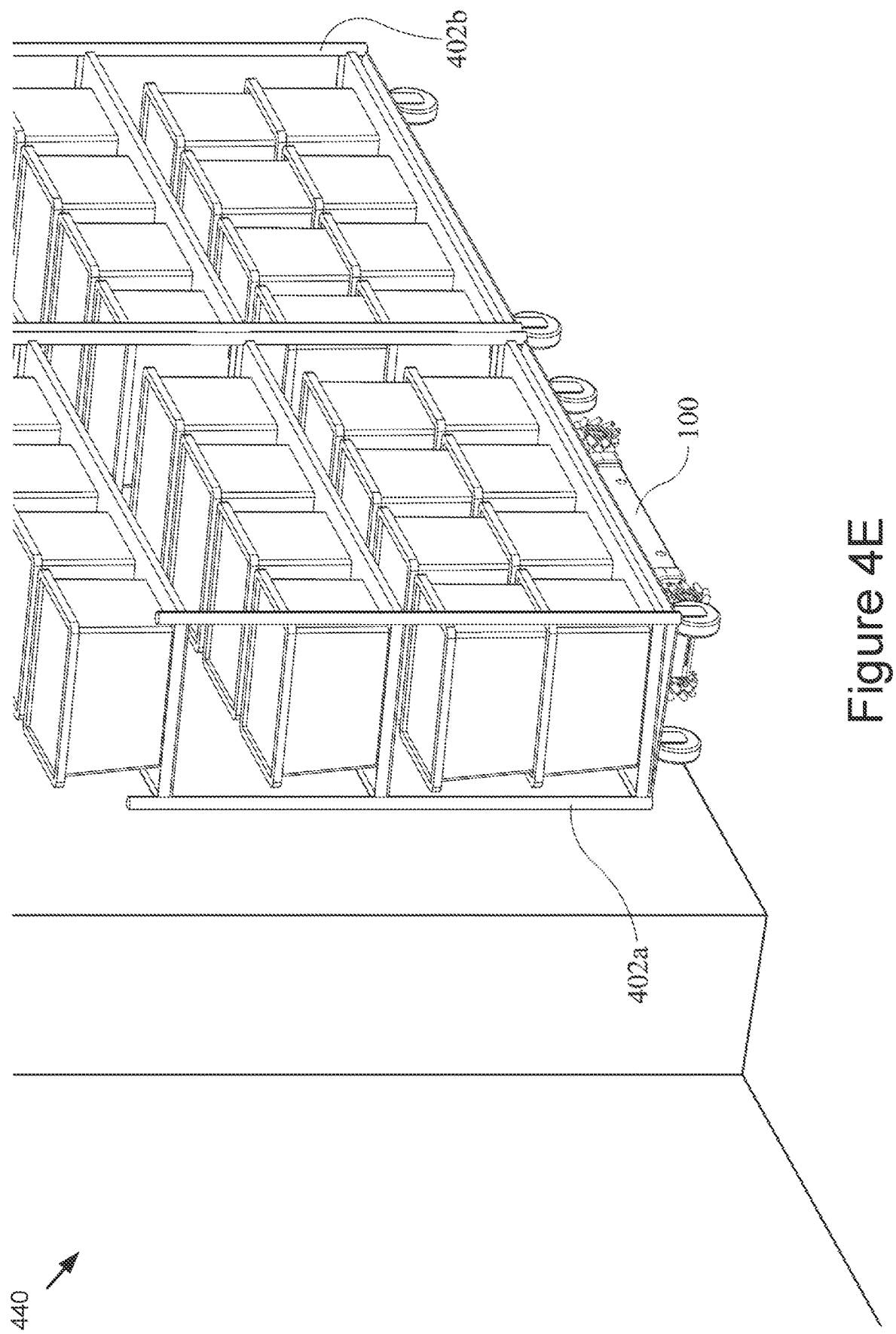
Figure 4G:
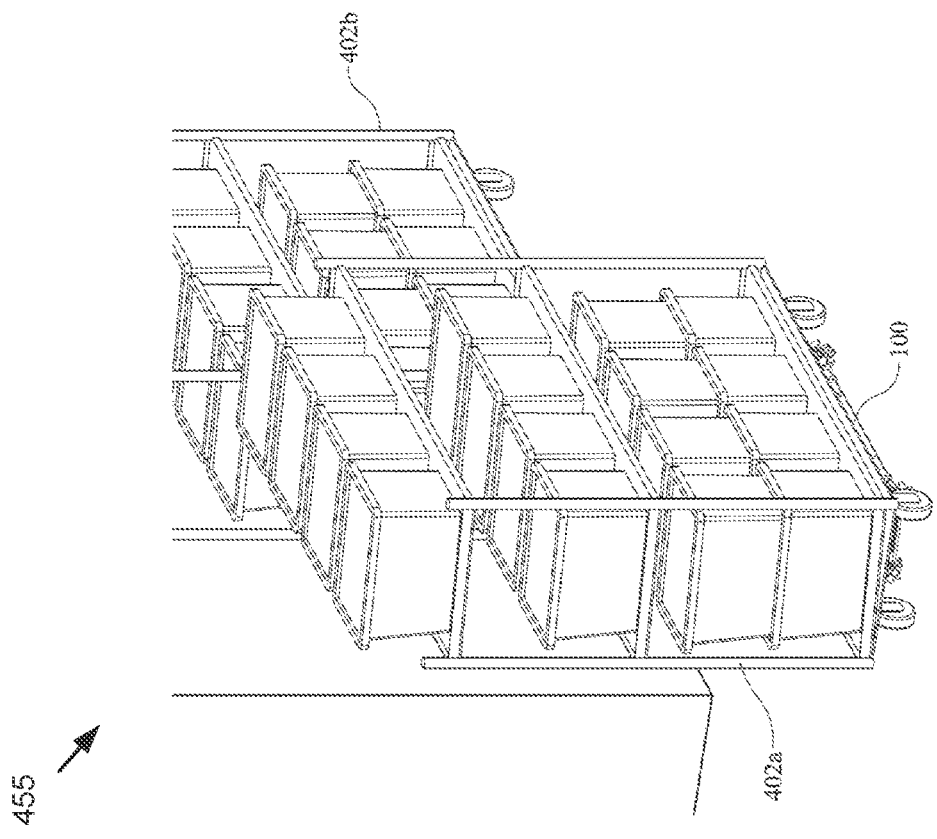

Continuing the example depicted in FIGS. 4A-4K, in the stage 440 illustrated in FIG. 4E, the shelf-transport AGV 100 may lift the shelving unit 402*a*. As depicted, the shelving unit 402*a* may be lifted to the elevated position having a higher distance to the floor surface as compared to the shelving unit 402*b* that is not transported. As illustrated in FIG. 4E, the shelf-transport AGV 100 may support the shelving unit 402*a* from underneath the shelving unit 402*a* as the shelving unit 402*a* is situated on the support surface 130 of the shelf-transport AGV 100.

In block 310, the shelf-transport AGV 100 may transport the shelving unit situated on the support surface 130 to the target position of the shelving unit in the operating environment. In some embodiments, in order to transport the shelving unit, responsive to the shelf-transport AGV 100 lifting the shelving unit up, the AGV controller 160 may actuate one or more power motors of the shelf-transport AGV 100 to start moving the shelf-transport AGV 100 at an initial acceleration rate satisfying an acceleration rate threshold (e.g., less than 0.5 m/s$^2$). For instance, the shelf-transport AGV 100 may start moving slowly with the shelving unit situated on the support surface 130, thereby reducing the likelihood of the shelving unit being tipped over. In some embodiments, the AGV controller 160 may gradually increase the acceleration rate and/or the moving speed of the shelf-transport AGV 100 as the shelf-transport AGV 100 proceeds towards the target position of the shelving unit.

In some embodiments, the AGV controller 160 may monitor the weight distribution of the shelving unit on the support surface 130 during the transportation of the shelving unit, and flexibly adapt the first and/or second lifting forces and/or lifting heights to lift the shelving unit based on the changing weight distribution. As an example, the first sensor may detect that the weight of the shelving unit applied to the first portion 141 of the support surface 130 increases from 100 kg to 200 kg, and the second sensor may detect that the weight of the shelving unit applied to the second portion 143 of the support surface 130 decreases from 250 kg to 150 kg (e.g., due to an incline of the shelving unit towards the first end of the support surface 130 that is proximate to the first portion 141). In this example, the lifting mechanism 132 may actuate its motors to increase the first lifting force provided via the first portion 141 of the support surface 130, and decrease the second lifting force provided via the second portion 143 of the support surface 130, thereby regaining the balance of the shelving unit on the support surface 130. In some embodiments, the lifting mechanism 132 may adjust the first lifting force proportionally to the weight of the shelving unit currently applied to the first portion 141 of the support surface 130 (e.g., 200 kg), and adjust the second lifting force proportionally to the weight of the shelving unit currently applied to the second portion 143 of the support surface 130 (e.g., 150 kg).

In some embodiments, to transport the shelving unit, the guidance unit may navigate the shelf-transport AGV 100 to the target position of the shelving unit in the operating environment from the second position at which the shelf-transport AGV 100 lifts the shelving unit up. In some embodiments, the guidance unit may reference the map of the operating environment (e.g., the facility map of the storage facility), and determine a navigation path from the second position to the target position. To follow the navigation path to the target position, the reader device 174 may detect the graphic markers on the floor surface as the shelf-transport AGV 100 proceeds in the operating environment. The guidance unit may map these graphic markers to the navigation path, generate navigating instructions to follow the navigation path, and provide the navigating instructions to the drive unit. The drive unit may actuate its power motors and/or its driving actuators to move the shelf-transport AGV 100 based on the navigating instructions. As a result, the shelf-transport AGV 100 may follow the navigation path to transport the shelving unit situated on the support surface 130 from the second position to the target position of the shelving unit. Other implementations for navigating the shelf-transport AGV 100 to the target position of the shelving unit are also possible and contemplated.

In some embodiments, as the shelf-transport AGV 100 proceeds towards the target position of the shelving unit, the indicator 120 may project one or more signals that indicate the presence and/or the operation performed by the shelf-transport AGV 100 to other entities located proximate to the shelf-transport AGV 100 in the operating environment. For example, the indicator 120 may emit different light signals in different light colors depending on the operation currently performed by the shelf-transport AGV 100 (e.g., slowing down, speeding up, turning left, turning right, etc.), which embodiment may be advantageous because it enables the human workers and other AGVs located nearby to be aware of the shelf-transport AGV 100 and the operations performed by the shelf-transport AGV 100, especially in case the low-elevated and elongated body of the shelf-transport AGV 100, which may not be visible due to the shelving unit situated on the support surface 130 of the shelf-transport AGV 100.

Figure 4F:
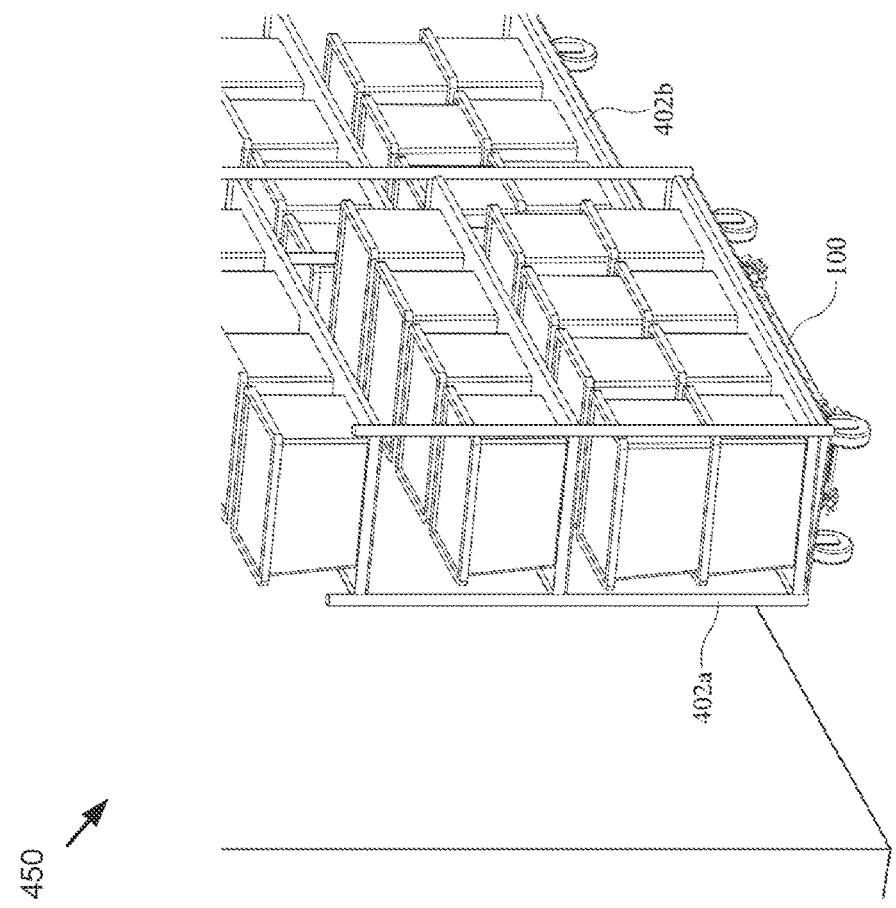
Figure 4I:
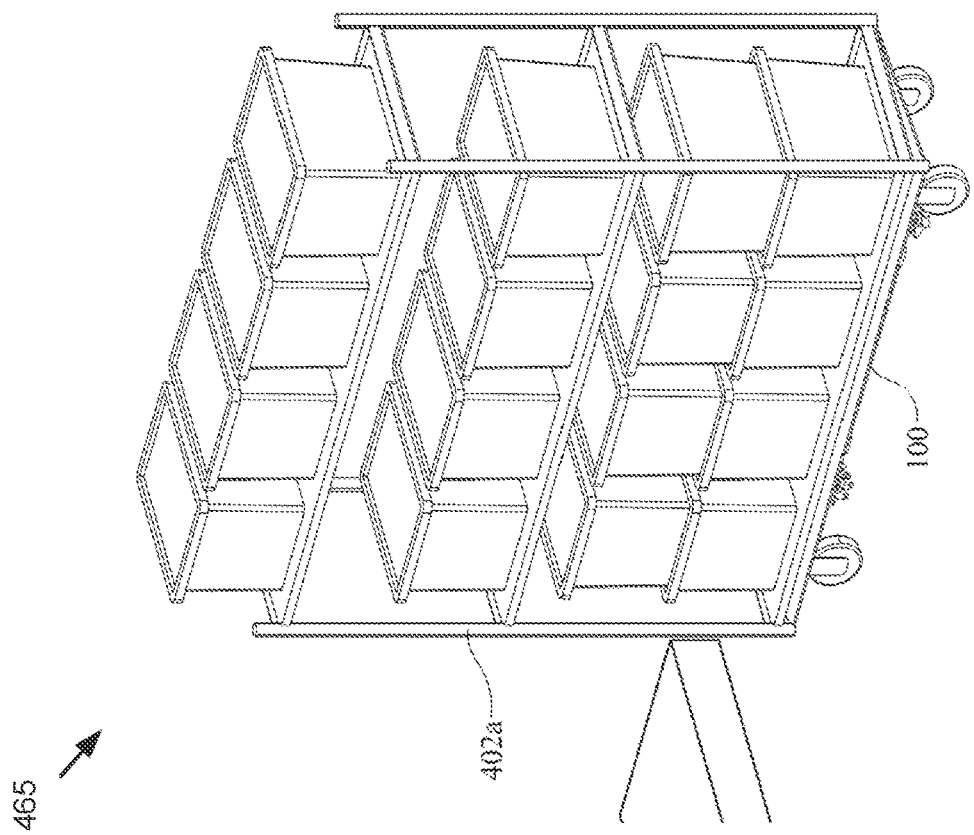

Continuing the example depicted in FIGS. 4A-4K, in the stage 450 illustrated in FIG. 4F, the shelf-transport AGV 100 may transport the shelving unit 402*a* out of the second position at which the shelf-transport AGV 100 lifted the shelving unit 402*a* off the floor surface and situated the shelving unit 402*a* on its support surface 130. In the stage 455 illustrated in FIG. 4G, the shelf-transport AGV 100 may transport the shelving unit 402*a* situated on the support surface 130 to the target position of the shelving unit 402*a*.

In block 312, the guidance unit may determine that the shelf-transport AGV 100 reached the target position of the shelving unit. In some embodiments, the reader device 174 may detect a graphic marker on the floor surface. The guidance unit may map this graphic marker to the navigation path, determine that this graphic marker corresponds to the target position of the shelving unit, and thus determine that the shelf-transport AGV 100 reached the target position to which the shelving unit is transported. The drive unit may then stop the shelf-transport AGV 100 at the target position of the shelving unit.

In block 314, responsive to determining that the shelf-transport AGV 100 reached the target position of the shelving unit, the shelf-transport AGV 100 may lower the shelving unit from the elevated position to place the shelving unit at the target position of the shelving unit. In some embodiments, to lower the shelving unit, the lifting mechanism 132 may actuate its motors to lower the support surface 130 on which the shelving unit is situated from the elevated position to the position at which the shelving unit comes into contact with the floor surface (e.g., ground floor, vehicle floor, etc.). As a result, the shelving unit is placed on the floor surface at the target position of the shelving unit, and thus the transportation of the shelving unit to its target position is completed. In some embodiments, once the lifting mechanism 132 lowers the support surface 130 to the position at which the shelving unit comes into contact with the floor surface, the lifting mechanism 132 may further lower the support surface 130 to the position at which the clearance space between the bottom surface of the shelving unit and the shelf-transport AGV 100 satisfies a clearance threshold (e.g., more than 1 cm), which may allow the shelf-transport AGV 100 to safely relocate out of the space underneath the shelving unit.

Figure 4H:
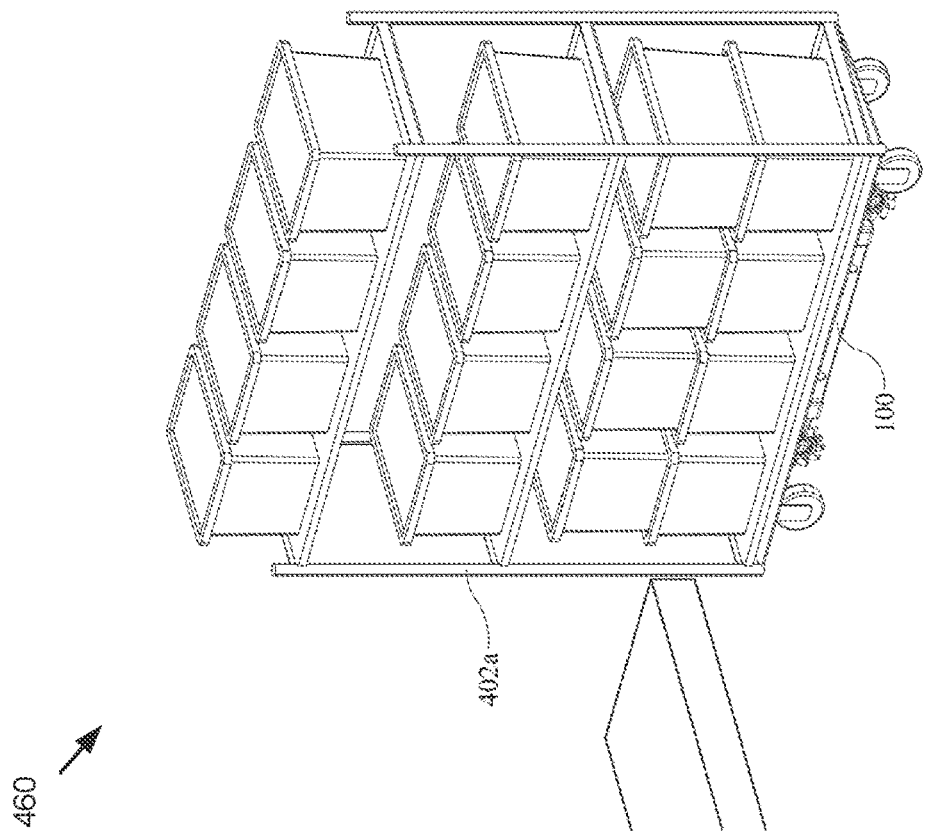
Figure 4K:
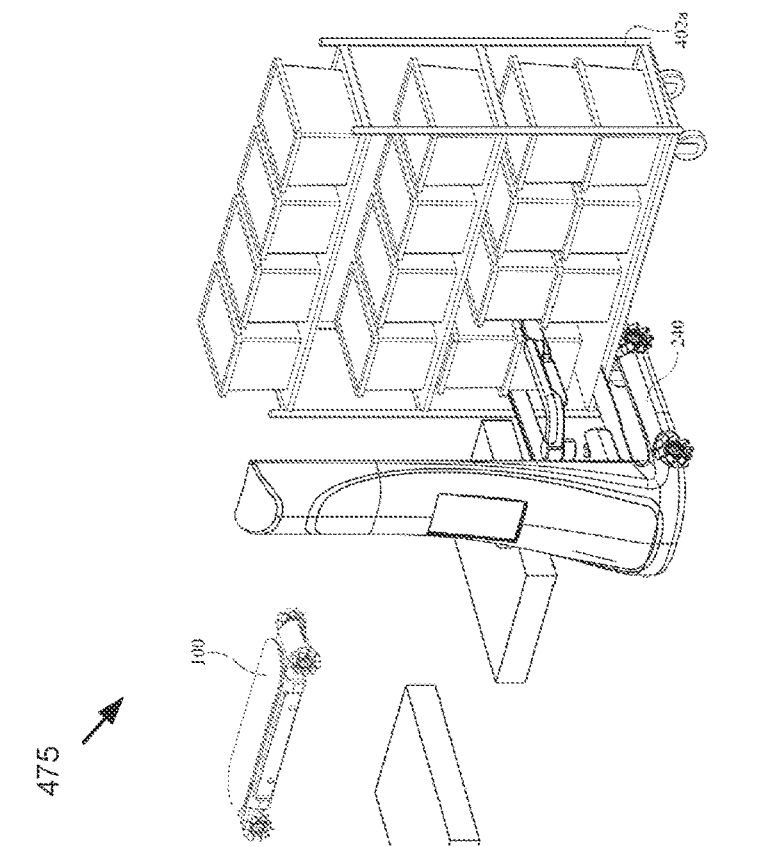
Figure 4J:
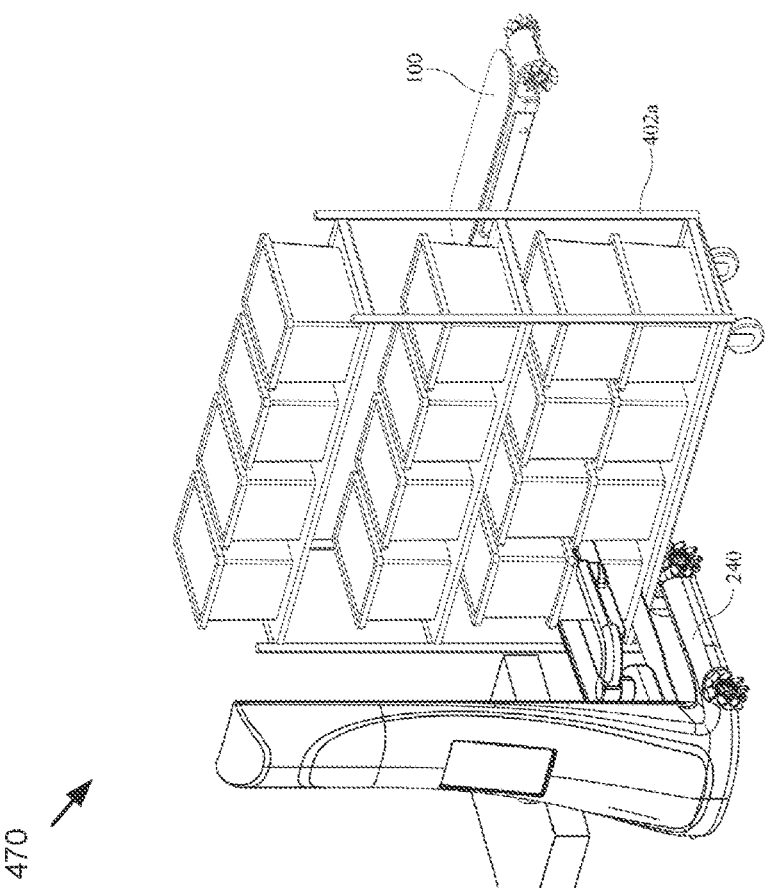

Continuing the example depicted in FIGS. 4A-4K, in the stage 460 illustrated in FIG. 4H, as the shelf-transport AGV 100 reaches the target position of the shelving unit 402a, the shelf-transport AGV 100 may stop at the target position of the shelving unit 402a. In the stage 465 illustrated in FIG. 4I, the shelf-transport AGV 100 may lower the support surface 130 on which the shelving unit is situated to place the shelving unit 402a on the floor surface at the target position of the shelving unit 402a. In the stage 470 illustrated in FIG. 4J, after placing the shelving unit on the floor surface at its target position, the shelf-transport AGV 100 may relocate out of the space underneath the shelving unit 402a. In the stage 475 illustrated in FIG. 4K, the shelf-transport AGV 100 may relocate away from the target position of the shelving unit 402a as the transportation of the shelving unit 402a to its target position is completed.

In some embodiments, once the shelf-transport AGV 100 transports the shelving unit to the target position of the shelving unit, one or more other AGVs in the operating environment may relocate towards the shelving unit that is placed at its target position and unload one or more containers from the shelving unit. As depicted in the stage 470 illustrated in FIG. 4J and the stage 475 illustrated in FIG. 4K, a container-transport AGV 240 may relocate to a position proximate to the shelving unit 402a and transport the containers from the shelves of the shelving unit 402a, e.g., to the floor surface.

It should be understood that the shelf-transport AGV 100 can advantageously transport the shelving unit in any operating environment. For example, the shelf-transport AGV 100 may perform the method 300 described above with reference to FIG. 3 to transport a shelving unit from the initial position of the shelving unit in a delivery vehicle to the target position of the shelving unit in the storage facility. As discussed elsewhere herein, the shelf-transport AGV 100 may align itself to a shelving unit located in the delivery vehicle at a first position relative to the shelving unit, relocate from the first position to a second position underneath the bottom surface of the shelving unit, lift the shelving unit up using a first lifting force and a second lifting force provided via a first portion and a second portion of the support surface on which the shelving unit is situated, and transport the shelving situated on the support surface to the target position of the shelving unit in the storage facility. The shelf-transport AGV 100 may determine that the shelf-transport AGV 100 reached the target position of the shelving unit, and lower the support surface on which the shelving unit is situated to place the shelving unit at its target position in the storage facility. Thus, the shelf-transport AGV 100 may automatically unload the shelving unit from the delivery vehicle onto the floor surface of the storage facility. Other example scenarios are also possible and contemplated.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input and/or output devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. An automated guided vehicle (AGV) comprising:
    a lift platform including:
        a support surface adapted to contact a surface of a shelving unit and provide support from underneath the shelving unit when the support surface is in an elevated position and the shelving unit is situated on the support surface; and
        a lifting mechanism including one or more motors coupled to the support surface and providing a first lifting force via a first portion of the support surface and a second lifting force via a second portion of the support surface, the first lifting force and the second lifting force vertically lifting or lowering the shelving unit via the support surface;
    one or more marker sensors adapted to detect one or more markers; and
    an AGV controller configured to control one or more operations of the AGV, the one or more operations including:
        detecting a first marker of the one or more markers on a floor proximate to the shelving unit;
        aligning a longitudinal dimension of the AGV with a longitudinal dimension of the shelving unit at a first position using the first marker;
        detecting a second marker of the one or more markers on the shelving unit; and
        adaptively relocating the AGV from the first position to a second position under the shelving unit using the second marker on the shelving unit.

2. The AGV of claim 1, further comprising:
    a first sensor coupled to the first portion of the support surface and a second sensor coupled to the second portion of the support surface, the first sensor and the second sensor detecting a weight distribution of the shelving unit when the shelving unit is supported by the support surface.

3. The AGV of claim 1, wherein:
    the surface of the shelving unit is a bottom surface of the shelving unit; and
    the support surface is extended along at least a portion of the bottom surface of the shelving unit, the portion of the bottom surface of the shelving unit satisfying a length threshold associated with a length of the shelving unit.

4. The AGV of claim 1, further comprising:
    a drive unit including one or more multi-directional wheels that are coupled to the lift platform and rotatable around two or more axes to move the AGV.

5. The AGV of claim 4, wherein:
    the lift platform and the drive unit form a low-elevated and elongated body of the AGV; and
    low-elevated indicates that the elongated body of the AGV has a height that satisfies a dimension threshold associated with a space underneath the surface of the shelving unit.

6. The AGV of claim 1, further comprising:
    a guidance unit including the one or more marker sensors that detect the one or more markers in an operating environment to navigate the AGV in the operating environment.

7. The AGV of claim 1, wherein the support surface is a flat surface.

8. The AGV of claim 1, wherein the AGV controller executes one or more instructions that cause the AGV to:
    align the AGV to the shelving unit at the first position relative to the shelving unit;
    relocate the AGV from the first position to the second position underneath the surface of the shelving unit;
    lift the shelving unit using the first lifting force provided via the first portion of the support surface and the second lifting force provided via the second portion of the support surface; and
    transport the shelving unit situated on the support surface to a target position.

9. The AGV of claim 8, wherein aligning the AGV to the shelving unit includes detecting the first marker associated with the first position relative to the shelving unit, the first marker including a graphic marker.

10. The AGV of claim 8, wherein relocating the AGV from the first position to the second position includes:
    determining the second position underneath the surface of the shelving unit at which a center point of the support surface of the lift platform is proximate to a center point of the surface of the shelving unit.

11. The AGV of claim 8, wherein transporting the shelving unit includes:
    responsive to lifting the shelving unit, starting to move the AGV at an initial acceleration rate satisfying an acceleration rate threshold.

12. The AGV of claim 8, wherein the one or more instructions, when executed by the AGV controller, cause the AGV to:
    determine that the AGV reached the target position; and
    responsive to determining that the AGV reached the target position, lower the support surface on which the shelving unit is situated from the elevated position to place the shelving unit at the target position.

13. The AGV of claim 1, wherein the support surface is adaptively adjustable to a slope of the surface of the shelving unit.

14. A method comprising:
detecting a first marker on a floor proximate to a shelving unit;
aligning a length of an automated guided vehicle (AGV) to a length of the shelving unit at a first position relative to the shelving unit based on the first marker, the AGV including one or more marker sensors adapted to detect one or more markers, the one or more markers including the first marker;
detecting a second marker of the one or more markers on the shelving unit;
adaptively relocating the AGV from the first position to a second position underneath a surface of the shelving unit based on the second marker on the surface of the shelving unit, the one or more markers including the second marker;
lifting the shelving unit using a lift platform of the AGV, the lift platform including a support surface coupled to a lifting mechanism, the lifting mechanism elevating the support surface to an elevated position to situate the shelving unit on the support surface, the lifting mechanism providing a first lifting force via a first portion of the support surface and a second lifting force via a second portion of the support surface, the first lifting force and the second lifting force vertically lifting the shelving unit on the support surface based on a weight distribution of the shelving unit on the support surface; and
transporting the shelving unit situated on the support surface to a target position in an operating environment.

15. The method of claim 14, further comprising:
detecting, using a first sensor coupled to the first portion of the support surface and a second sensor coupled to the second portion of the support surface, the weight distribution of the shelving unit when the shelving unit is supported by the support surface.

16. The method of claim 14, further comprising:
adjusting the support surface to a slope of the surface of the shelving unit.

17. The method of claim 14, wherein:
the surface of the shelving unit is a bottom surface of the shelving unit; and
the support surface supports the shelving unit from underneath the shelving unit when the shelving unit is situated on the support surface, the support surface extended along at least a portion of the bottom surface of the shelving unit and the portion of the bottom surface of the shelving unit satisfying a length threshold.

18. The method of claim 14, wherein:
the AGV includes a drive unit comprising one or more multi-directional wheels that are coupled to the lift platform and rotatable around two or more axes to move the AGV; and
the lift platform and the drive unit form a low-elevated and elongated body of the AGV, the low-elevated and elongated body of the AGV satisfying a dimension threshold associated with a space underneath the surface of the shelving unit.

19. The method of claim 14, wherein:
aligning the AGV to the shelving unit at the first position includes detecting the first marker associated with the first position relative to the shelving unit, the first marker including a graphic marker; and
transporting the shelving unit to the target position includes detecting one or more graphic markers in the operating environment to navigate the AGV to the target position.

20. A method comprising:
detecting a first marker on a floor proximate to a shelving unit;
aligning a length of an automated guided vehicle (AGV) to a length of the shelving unit in a vehicle at a first position relative to the shelving unit based on the first marker, the AGV including one or more marker sensors adapted to detect one or more markers, the one or more markers including the first marker;
detecting a second marker of the one or more markers on the shelving unit;
adaptively relocating the AGV from the first position to a second position underneath a surface of the shelving unit based on the second marker on the surface of the shelving unit, the one or more markers including the second marker;
lifting the shelving unit using a lift platform of the AGV, the lift platform including a support surface coupled to a lifting mechanism, the lifting mechanism elevating the support surface to an elevated position to situate the shelving unit on the support surface, the lifting mechanism providing a first lifting force via a first portion of the support surface and a second lifting force via a second portion of the support surface, the first lifting force and the second lifting force vertically lifting the shelving unit on the support surface based on a weight distribution of the shelving unit on the support surface;
transporting the shelving unit situated on the support surface to a target position in a facility;
determining that the AGV reached the target position; and
responsive to determining that the AGV reached the target position, lowering the support surface on which the shelving unit is situated from the elevated position to place the shelving unit at the target position in the facility.

* * * * *